(12) United States Patent
Miyazaki et al.

(10) Patent No.: US 7,209,709 B2
(45) Date of Patent: Apr. 24, 2007

(54) APPARATUS AND METHOD FOR DISCRIMINATING INFORMATION TRANSMITTED USING RADIO SIGNAL

(75) Inventors: Shunji Miyazaki, Kawasaki (JP); Takaharu Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 413 days.

(21) Appl. No.: 10/317,706

(22) Filed: Dec. 12, 2002

(65) Prior Publication Data

US 2003/0148737 A1    Aug. 7, 2003

(30) Foreign Application Priority Data

Feb. 6, 2002    (JP)    ............... 2002-028891

(51) Int. Cl.
*H04B 17/00*    (2006.01)
(52) U.S. Cl. ............... 455/67.11; 455/63.1; 455/67.13; 455/337
(58) Field of Classification Search ............. 455/67.11, 455/337, 127.1, 226.1, 11.1, 13.1, 522, 63.1, 455/67.13
See application file for complete search history.

(56) References Cited

U.S. PATENT DOCUMENTS 6,614,776 B1 *    9/2003    Proctor, Jr. .................. 370/342
6,741,867 B1 *    5/2004    Tetsuya ....................... 455/522
6,748,194 B2 *    6/2004    Oh et al. ..................... 455/11.1

2003/0065993 A1    4/2003    Kaji

FOREIGN PATENT DOCUMENTS

| EP | 1 024 634 | 8/2000 |
|---|---|---|
| JP | 2000-115260 | 4/2000 |
| JP | 2000-224250 | 8/2000 |
| JP | 2001-204072 | 7/2001 |

OTHER PUBLICATIONS

TSG-RAN Working Group 4 Correction of AICH Performance. (Radio Meeting #17) R4-010593 May 21-25, 2001.

* cited by examiner

*Primary Examiner*—Edward F. Urban
*Assistant Examiner*—Raymond S. Dean
(74) *Attorney, Agent, or Firm*—Katten Muchin Rosenman LLP

(57) ABSTRACT

A transmission circuit transmits a connection request including a "signature" to a base station. The demodulator demodulates the AICH for transmitting a notification corresponding to the connection request. When requested communications are enabled, the AICH transmits the "signature". A multiplier multiplies a demodulation signal by the "signature". A voltage computation unit converts the output of the multiplier into a voltage value. An integrator integrates the voltage value computed by the voltage computation unit for each received symbol for the respective symbols corresponding to the "signature". A threshold generation unit adaptively selects one of a threshold determined based on the noise of a transmission path or a threshold determined based on the receiving power. If the output of the integrator is larger than the selected threshold, it is determined that the communications have been enabled.

9 Claims, 24 Drawing Sheets

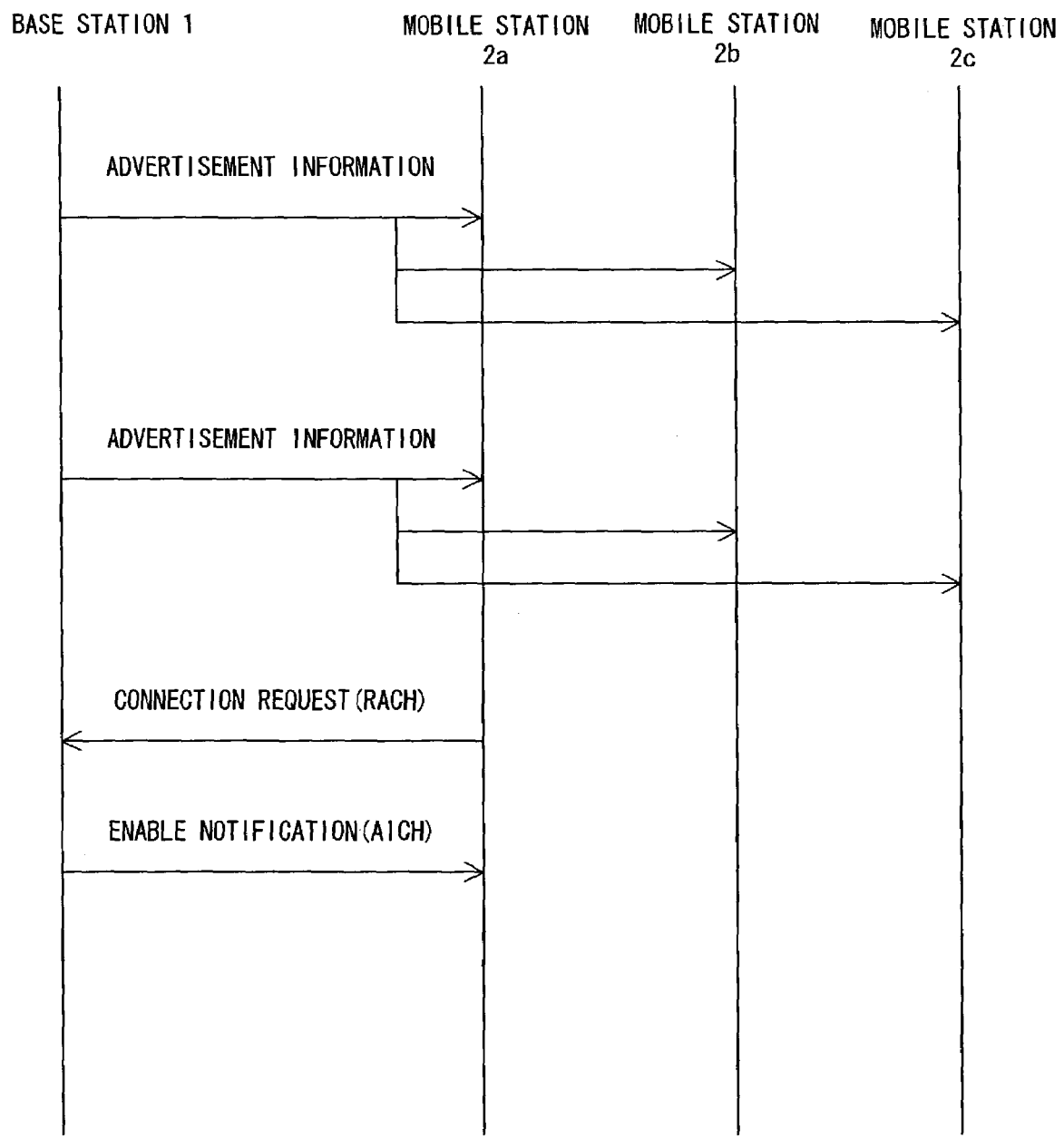
F I G. 5

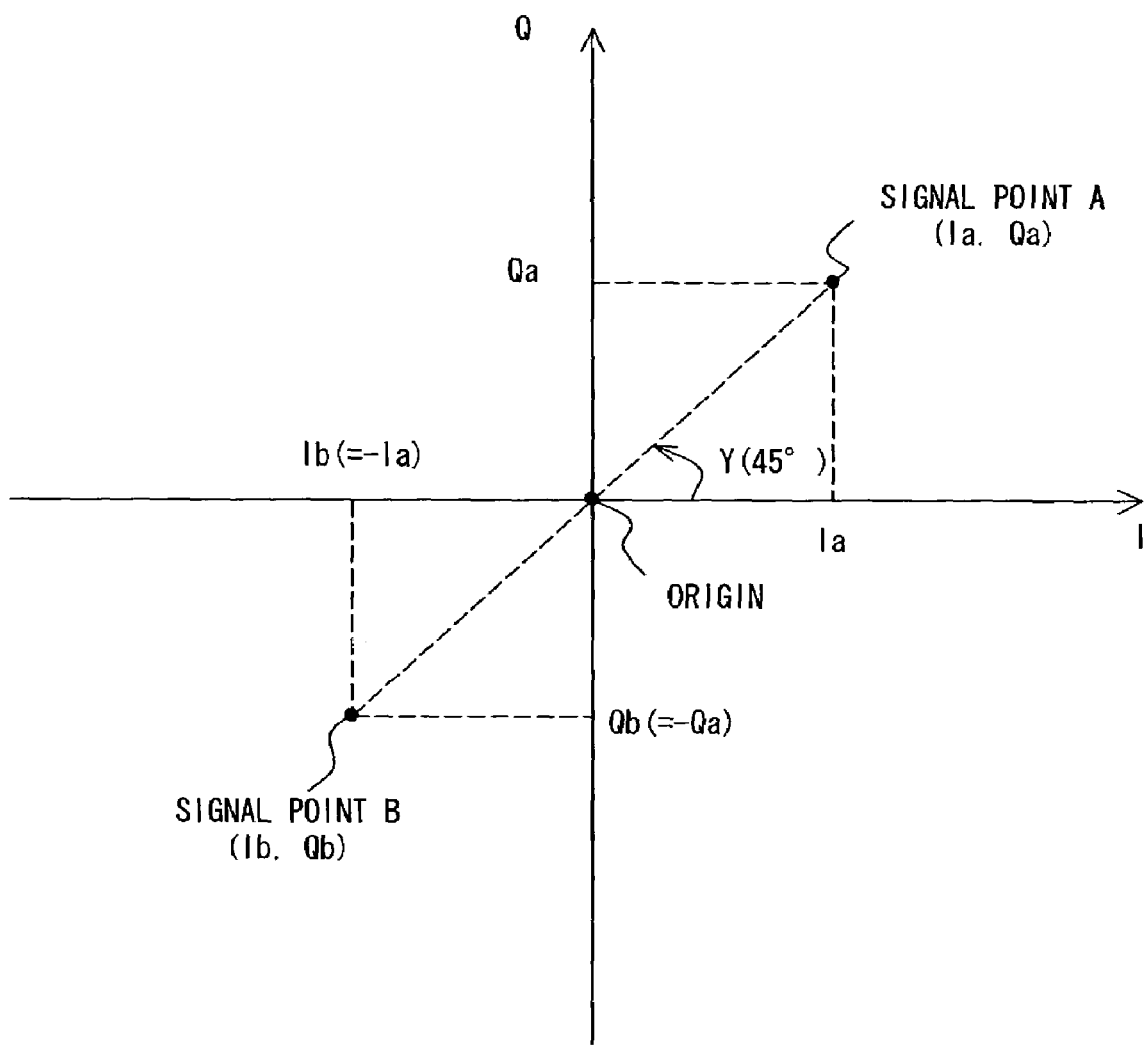
F I G. 7

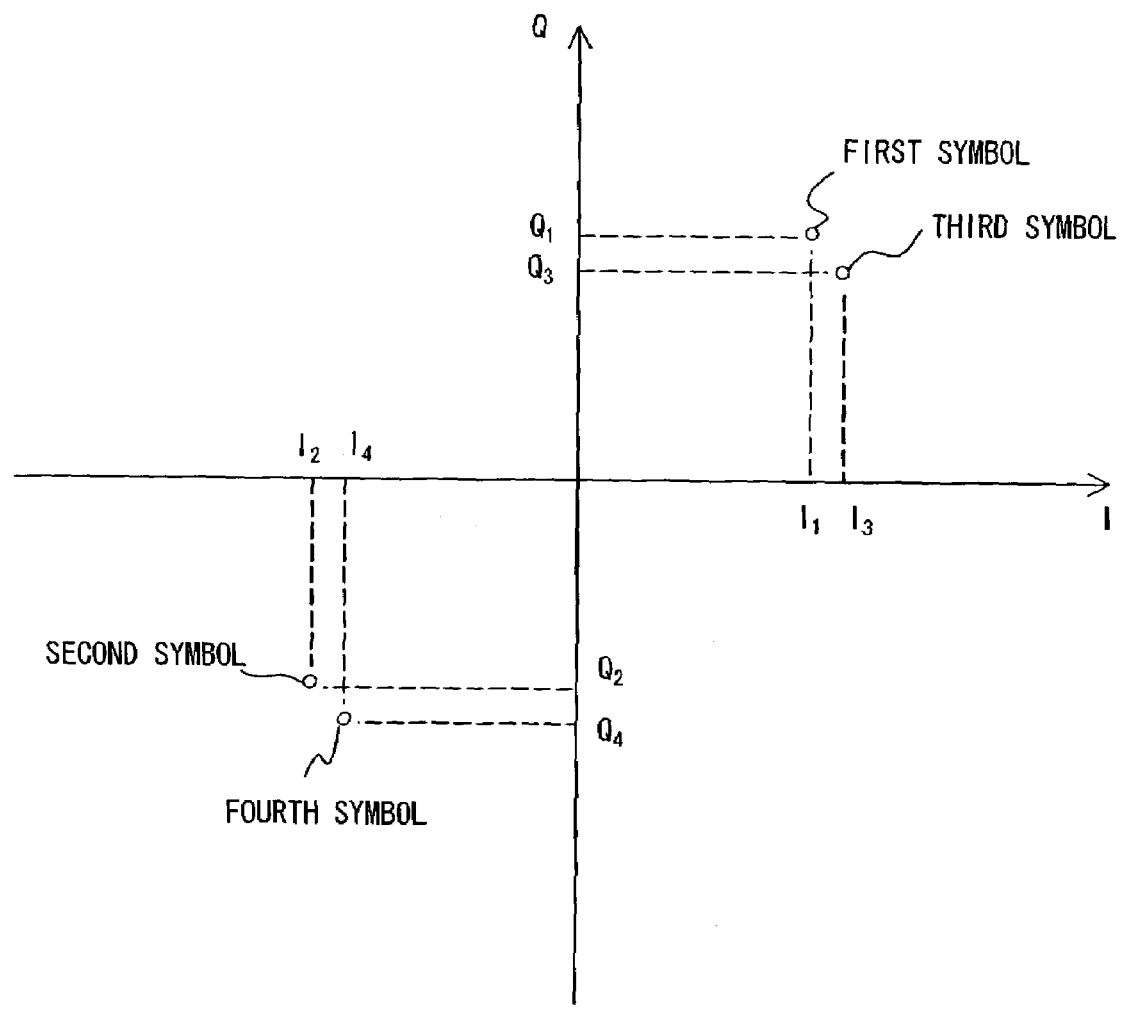
F I G. 1 0

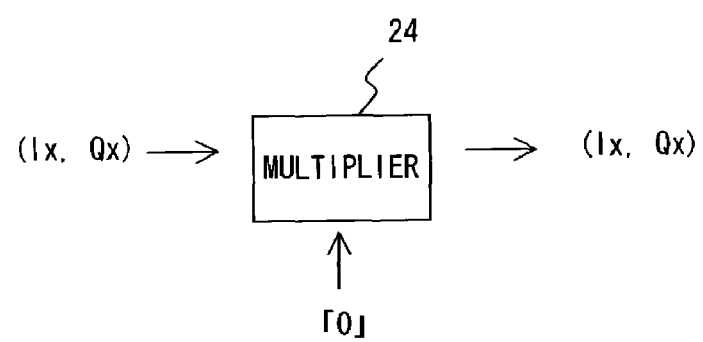
F I G. 1 1 A
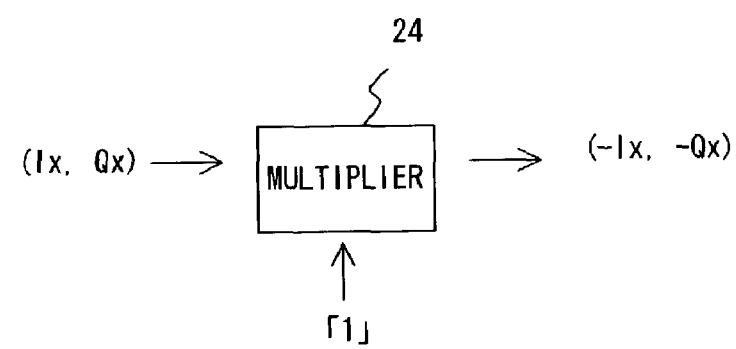
F I G. 1 1 B

APPARATUS AND METHOD FOR DISCRIMINATING INFORMATION TRANSMITTED USING RADIO SIGNAL

BACKGROUND OF THE INVENTION

1. Field of the Invention

The present invention relates to an apparatus and a method for discriminating the information transmitted using a radio signal, and more specifically to an apparatus and a method for discriminating the information transmitted from a base station in a mobile communications system.

2. Description of the Related Art

Some methods have conventionally be suggested or developed as procedures of commencing communications in the mobile communications system. For example, a random access control is adopted in the W-CDMA (Wideband CDMA) of the IMT-2000 (International Mobile Telecommunication 2000).

In the random access control, advertisement information is broadcast from a base station to each mobile station in the communications area of the base station. Upon receipt of the advertisement information, the mobile station transmits a connection request to the base station when it requests to start communications. The connection request includes a terminal identifier of a predetermined bit length referred to as a "signature". The "signature" to be transmitted is selected at random by the mobile station from among a plurality of predetermined codes, and a transmission timing of it is selected at random by the mobile station from among a plurality of predetermined probable timings.

Upon receipt of a connection request including the "signature", the base station determines whether or not the requested communications are to be enabled, and the determination result is transmitted to the mobile station. At this time, the determination result is transmitted to the mobile station using a channel referred to as an AICH (Acquisition Indicator channel). Practically, when a base station enables requested communications, a received "signature" is returned as is to the mobile station using a predetermined slot (hereinafter referred to as a "notification slot") in the AICH. On the other hand, when requested communications are to be disabled, the notification slot is set in a no-signal state.

The mobile station demodulates the AICH, and determines whether or not the "signature" is set in the notification slot. If the "signature" is set in the notification slot of the AICH, then the mobile station determines that the requested communications are enabled, and starts the communications. On the other hand, if no "signature" exists, the mobile station determines that the requested communications have been disabled, and stop the subsequent processes.

The above mentioned discrimination procedure includes a process of multiplying the code stored in the notification slot of the AICH by the "signature", a process of integrating the multiplication result, and a process of determining whether or not communications are enabled based on the integral. When the communication is enabled, the integral become a "predetermined value Sc" corresponding to the power or amplitude of a received signal. If the communication is disabled, the integral is "0". The mobile station detects whether or not the communications have been enabled based on the integral.

In the wireless communications system using phase modulation, information is transmitted normally using a predetermined signal point on a phase plane. The reception device regenerates the information by detecting the signal point of a received wave.

However, the position of the signal point in the phase plane fluctuates by noise. Therefore, the position of the signal point detected in the reception device fluctuates at random relative to the position of the signal point set in the transmission device, and the distribution of it is Gaussian. When the position of the signal point of a received signal follows the Gaussian distribution, the integral in the above mentioned determining process also follows the Gaussian distribution. Therefore, when the requested communications are enabled, the integral indicates the Gaussian distribution based on the "Sc" as shown in FIG. 1A. That is to say, when the requested communications are enabled, the integral is the most probably "Sc", but can be any value in the range between "Ls" and "Hs". On the other hand, when the requested communications are disabled, the integral indicates the Gaussian distribution based on zero. That is to say, when the requested communications are disabled, the integral is the most probably zero, but can be any value in the range between "Lo" and "Ho".

Therefore, the mobile station can determine whether or not the requested communications have been enabled by comparing a computed integral with a predetermined threshold as shown in FIG. 1A. Practically, the mobile station determines that the requested communications have been enabled if the integral is larger than the threshold. If the integral is smaller than the threshold, the mobile station determines that the requested communications have been disabled.

However, if the communications environment between the base station and the mobile station is not good and has much noise, then the distribution of the integral is extended as shown in FIG. 1B, and the integrals overlap each other. If the distance between the base station and the mobile station is long and the receiving power is small, then the integral obtained when the communications are enabled is small as shown in FIG. 1C. Then, the distributions of the integrals overlap each other. Therefore, if a threshold for determination as to whether or not the requested communications have been enabled is not appropriately set, then the mobile station may mistakenly determine that they are disabled although the base station enables the communications, or also may mistakenly determine that they have been enabled although the base station disables the communications.

For example, assume that the threshold TH1 is set in the communications environment in which the distribution as shown in FIG. 2A is obtained. In this case, if the computed integral is larger than the threshold TH1 although the requested communications have been disabled, then it is mistakenly determined that the communications have been enabled. At this time, the mobile station assumes that the communications have been enabled and performs corresponding processes although the requested communications have been disabled. Here, the radio signal transmitted from the mobile station in this processes is an interference signal with other channels. Mistakenly determining that the communications have been enabled although the requested communications have been actually disabled is hereinafter referred to as "misdetection", and the probability that it is mistakenly determined that the communications have been enabled although the requested communications have been actually disabled is referred to as a "probability of misdetection". The probability of misdetection is represented by the ratio of the area of the shaded portion to the area enclosed by the Gaussian distribution curve shown in FIG. 2A.

Otherwise, it is assumed that the threshold TH2 is set in the communications environment in which the distribution shown in FIG. 2B is obtained. In this case, if the computed integral is smaller than the threshold TH2 although the requested communications is enabled, then it is mistakenly determined that the communications have been disabled. At this time, the mobile station assumes that the communications have been disabled although the requested communications have been enabled, and stops the corresponding processes. That is to say, although a connection could have been made to the base station, the opportunity is lost. Mistakenly determining that the communications have been disabled although the requested communications have been enabled is hereinafter referred to as "omitted detection". The probability that it is determined that the communications have been disabled although the requested communications have been enabled is hereinafter referred to as a "probability of omitted detection". The probability of omitted detection is represented by the ratio of the area of the shaded portion to the area enclosed by the Gaussian distribution curve in FIG. 2B. The probability that it is correctly determined that the communications have been enabled when the requested communications have been enabled is referred to as a "probability of correct detection". The "probability of correct detection" is represented by "1—probability of omitted detection".

In the existing system, the threshold for use in determining whether or not the requested communications have been enabled is not uniquely defined, but is set such that the above mentioned probability of misdetection can maintain a constant value. Practically, it is assumed that the threshold is a value proportional to the root of the variance of a received signal. And using this threshold, the probability that disabled communications are mistakenly started can be suppressed at or lower than a predetermined value. This threshold is described in, for example, R4-010593 "Correction of AICH performance" of TSG-RAN Working group 4 (Radio).

However, if the threshold is determined as described above, the following problems occur.

(1) When the communications environment is good, the distribution of the integral obtained when the requested communications are enabled and the distribution of the integral obtained when they are disabled do not overlap each other, or overlap a little. Therefore, if the threshold is appropriately set as shown in FIG. 1A, the probability of misdetection and the probability of omitted detection can be zero or substantially zero. However, if the threshold is set such that the probability of misdetection is maintain a constant value, then the misdetection can occur at a certain rate although the misdetection can be avoided.

(2) When the communications environment is not good, the distribution of the integral obtained when the requested communications are enabled and the distribution of the integral obtained when they are disabled overlap each other to a large extent. In this case, if the probability of misdetection maintains a constant value, the probability of omitted detection is increased. That is, although the start of the communications is enabled, there is an increasing number of cases in which an opportunity of connecting to the base station will be lost.

(3) If the variance of a received signal is not correctly computed, there can be a stronger probability of misdetection. If the misdetection occurs, the communications not enabled by the base station can be started. Therefore, in this case, noise increases in the paths on which communications are being established.

Thus, in the conventional system, the threshold for determination as to whether or not the requested communications have been enabled has not always been determined in the optimum method. As a result, there can be the case in which no connection can be made to the base station although the communications are enabled, or the case in which the communications are started although they are not disabled.

The problem is not limited to the AICH, but can also occur with other control signal transmitted from a base station to a mobile station.

SUMMARY OF THE INVENTION

The present invention aims at reducing the determination error on the control signal transmitted in the mobile communications system.

The signal discrimination device according to the present invention, which is used in a mobile communications system for transmitting a radio signal from a first terminal device to a second terminal device, determines whether the radio signal indicates first information or second information. The signal discrimination device includes: a demodulation unit for demodulating a received radio signal; a threshold generation unit for selecting depending on the communications environment one of a first rule for generating a threshold depending on an amount of noise of the radio signal and a second rule for generating a threshold based on the receiving power or receiving amplitude of the radio signal, and generating a threshold according to the selected rule; and a discrimination unit for determining whether the radio signal indicates the first information or the second information based on the comparison result between the output of the demodulation unit and the threshold generated by the threshold generation unit.

In the signal discrimination device, the threshold for use in determining whether the radio signal indicates the first information or the second information is generated according to the rule depending on the communications environment. Therefore, although the communications environment has changed, whether the radio signal indicates the first information or the second information can be correctly determined.

When the radio signal includes a pilot signal and a notification signal containing one of the first information or the second information, the threshold generation unit can estimate the receiving power or the receiving amplitude of the notification signal based on the receiving power or the receiving amplitude of the pilot signal, and generate the threshold according to the second rule using the estimated value. In this case, the threshold is obtained without computing the variance of the radio signal. Therefore, the determination error caused by a computed incorrect variance can be suppressed.

BRIEF DESCRIPTION OF THE DRAWINGS

FIG. 5 shows the outline of the sequence of the random access control;

FIG. 7 is an explanatory view of the signal point used in an embodiment of the present invention;

FIG. 10 shows a signal point detected by a mobile station;

FIGS. 11A and 11B show operations of a multiplier;

DESCRIPTION OF THE PREFERRED EMBODIMENTS

The embodiments of the present invention are described below by referring to the attached drawings. The embodiments described below relate to the procedure used when the communications are started in the mobile communications system. As the procedure used when the communications are started in the mobile communications system according to the embodiments described below, the random access control adopted in the W-CDMA of IMT-2000 is assumed to be used.

Figure 3:
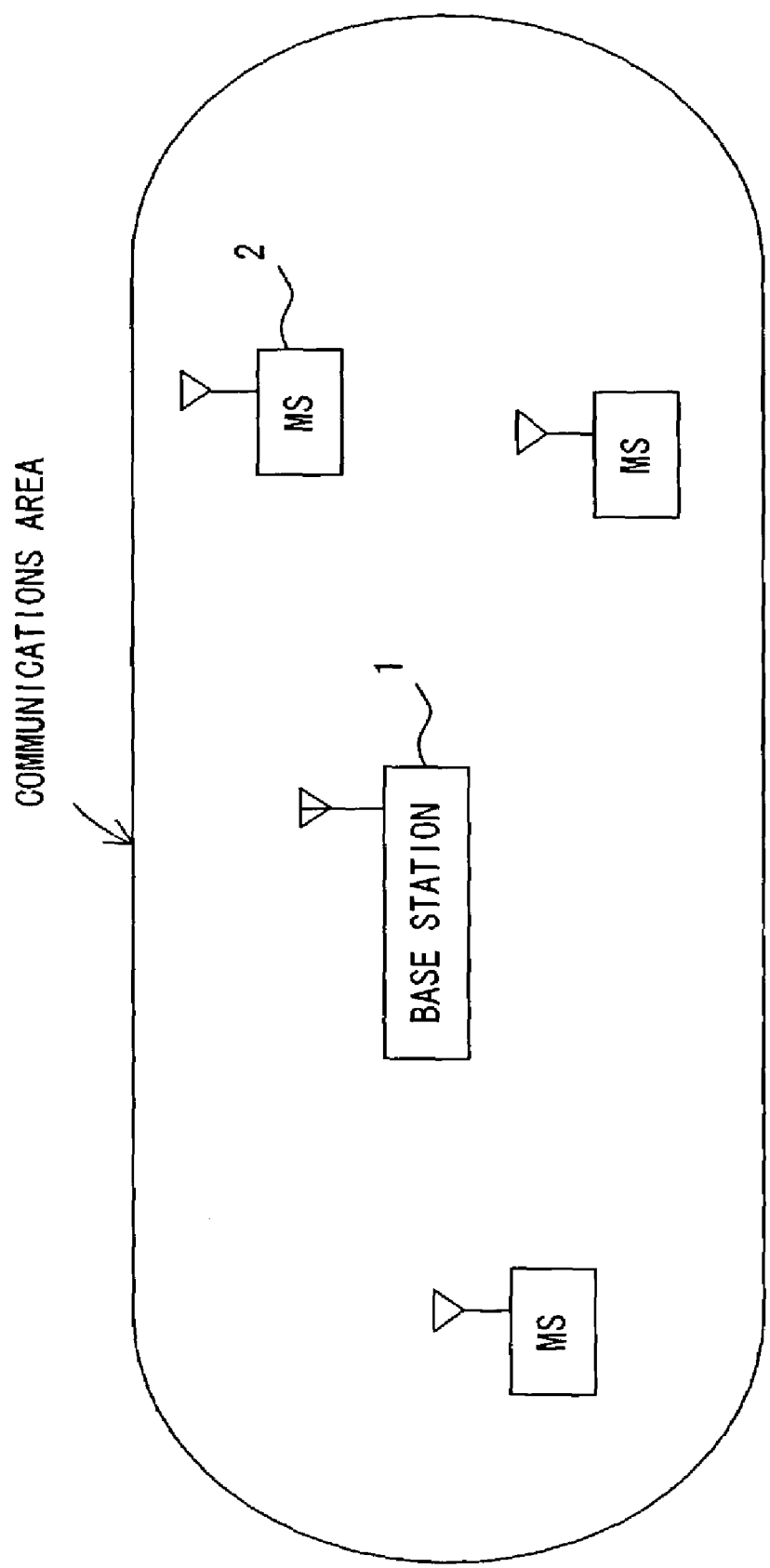
FIG. 3 shows the mobile communications system according to an embodiment of the present invention.

FIG. 3 shows the mobile communications system according to an embodiment of the present invention. In FIG. 3, a base station 1 comprises the function of transmitting and receiving a radio signal to and from mobile stations in a communications area. In addition, the base station 1 periodically broadcasts advertisement information to each mobile station in the communications area. On the other hand, a mobile station (MS) 2 has the function of transmitting and receiving a radio signal to and from the base station 1. The mobile station 2 transmits and receives data through the base station 1 when establishing communications with another station.

When establishing communications with another station, the mobile station 2 first transmits a connection request to the base station 1. Upon receipt of the connection request, the base station 1 determines whether or not the requested communications can be started, and returns a determination result to the mobile station 2. If the base station 1 enables the communications to be started, the mobile station 2 starts the communications (or control is passed to the next process in the procedure of requesting to start the communications).

Figure 4:
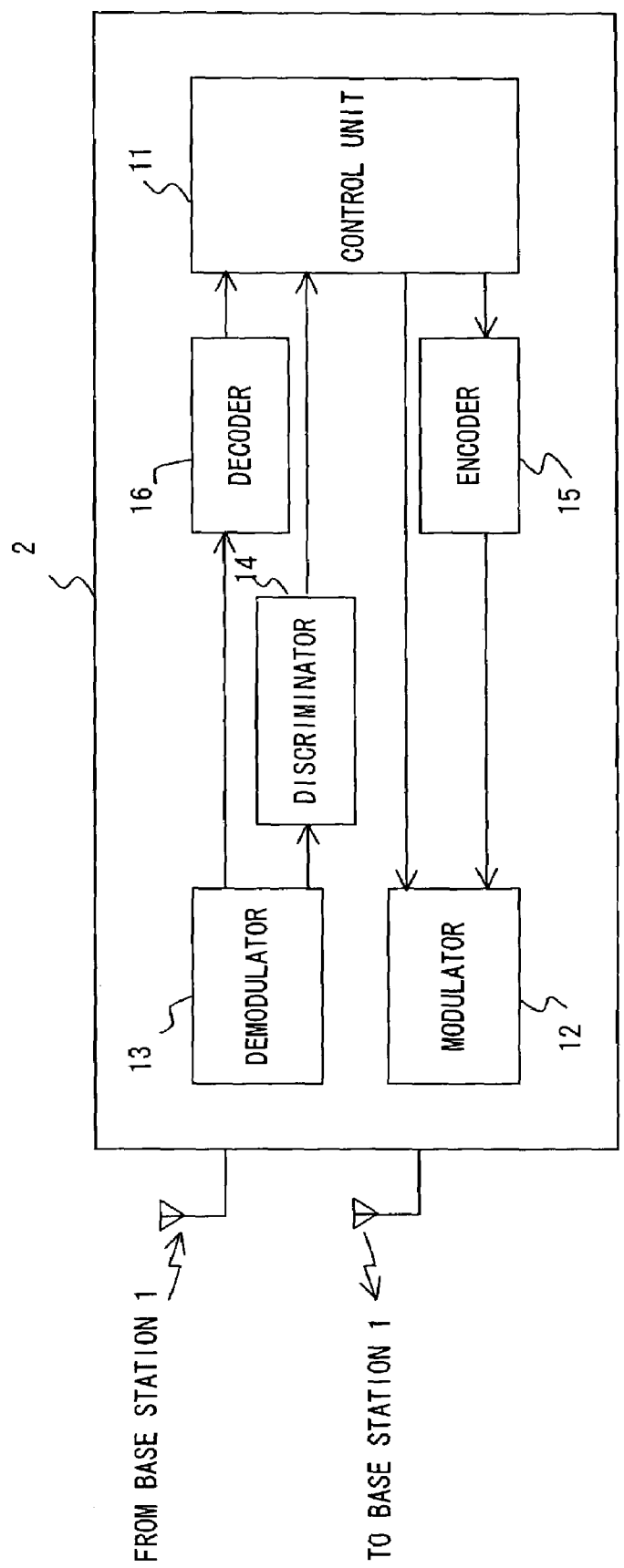
FIG. 4 is a block diagram of the mobile station.

FIG. 4 is a block diagram of the mobile station 2. A control unit 11 generates a connection request when starting communications with another station. The connection request is modulated by a modulator 12 and transmitted to the base station 1. The notification (corresponding to the connection request) from the base station 1 is demodulated by a demodulator 13, and then transmitted to a discriminator 14. Then, the discriminator 14 determines whether or not the communications have been allowed according to the demodulation signal, and notifies the control unit 11 of the determination result.

When the base station 1 enables the communications to be started, the data to be transmitted to another station is encoded by an encoder 15, modulated by the modulator 12, and transmitted to the base station 1. When a radio signal is received from the base station 1, the signal is demodulated by the demodulator 13, then decoded by a decoder 16, and passed to the control unit 11. If the base station 1 does not enable the communications to be started, the subsequent processes are stopped or suspended.

In the mobile station with the above mentioned configuration, the present invention specifically relates to the configuration and the operations of the discriminator 14.

Described below is the random access control in the release 4 of IMT-2000. In the release 4 of IMT-2000, RACH (Random Access channel) and AICH (Acquisition Indicator channel) are prescribed. The RACH is a control channel for transmitting a connection request from the mobile station 2 to the base station 1, and is configured by a preamble part and a message part. On the other hand, the AICH is a control channel for transmitting an enable notification from the base station 1 to the mobile station 2.

The RACH and the AICH are configured by a period of 15 access slots. Each access slot is configured by 20 symbols. 16 symbols in a predetermined access slot out of 15 access slots are used for a connection request or an enable notification.

The base station 1 periodically broadcasts advertisement information to each mobile station 2 (2a through 2c) in the communications area as shown in FIG. 5. Upon receipt of the advertisement information, the mobile station 2 transmits a connection request to the base station 1 using the RACH when the communications are to be started. In FIG. 5, the mobile station 2a transmits the connection request.

Figure 6A:
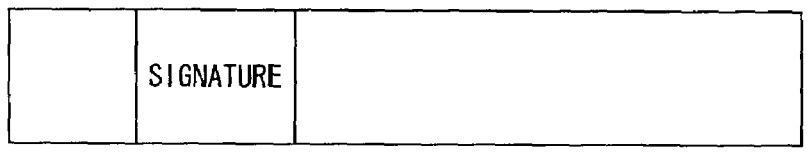
FIGS. 6A and 6D are explanatory view of setting a "signature"

The connection request includes a station identifier referred to as a "signature". The "signature" is realized by a 16-bit Waish-Hadamard orthogonal code. The mobile station 2 selects an optional code at random from 16 orthogonal codes which are designated by the advertisement information, and transmits the selected code as a "signature" to the base station 1. At this time, the "signature" is transmitted using an optional access slot selected at random by the mobile station 2 as shown in FIG. 6A.

Figure 6B:

Upon receipt of a connection request including a "signature" from the mobile station 2, the base station 1 determines whether or not the requested communications are to be enabled. At this time, the base station 1 determines whether or not the requested communications are to be enabled based on the number of unused channels. When the base station 1 enables the requested communications, it returns the "signature" received from the mobile station 2 as is using the AICH to the mobile station 2 as shown in FIG. 6B. The slot (notification slot) in which the "signature" is set in the AICH is determined corresponding to the position in which the "signature" is set in the RACH.

Figure 6C:
Figure 6D:

On the other hand, when the requested communications is disabled, the notification slot of the AICH is set in the no-signal state as shown in FIG. 6C. When the mobile station 2 is notified of "wait", the "inverted signature" is set in the notification slot of the AICH as shown in FIG. 6D. The "inverted signature" is a code whose bits or symbols forming the "signature" are inverted.

The base station 1 transmits information to the mobile station 2 using a predetermined signal point on a phase plane in QPSK. In the embodiment, three signal points (points A, B, and the origin) are used to transmit information from the base station 1 to the mobile station 2 through the AICH. Practically, for example, the signal point A is used to transmit "0", the signal point B is used to transmit "1". Therefore, when a "signature (or a inverted signature)" is returned from the base station 1 to the mobile station 2, these signal points A and B are used. That is, for example, if the leading bit of the "signature" is "0", and the second bit is "1", then the modulation signal for the signal point A is transmitted for one symbol time, and then the modulation signal for the signal point B is transmitted for one symbol time. The "no-signal state" corresponds to the origin on the phase plane.

The I component and the Q component of the signal point A are the same as each other as shown in FIG. 7. That is, Ia=Qa. Therefore, if a symbol is positioned at the signal point A, the phase $\phi$ of a signal for transmitting the symbol is "45 degrees", and the transmitting power of the signal is proportional to the square of the distance between the origin and the signal point A. There is the same relationship between the I component and the Q component of the signal point B. That is, Ib=Qb. The signal points A and B are symmetrically positioned about the origin as the reference point. That is, "Ib=−Ia" and "Qb=−Qa". Therefore, if a symbol is positioned at the signal point B, the phase $\phi$ of the signal for transmitting the symbol is "45+180 degrees", and the transmitting power of the signal is proportional to the square of the distance between the origin and the signal point B. Here, the distance between the origin and the signal point A is equal to the distance between the origin and the signal point B. Therefore, the power or the amplitude of a radio signal when information is transmitted using the signal points A and B is basically constant.

Figure 8A:
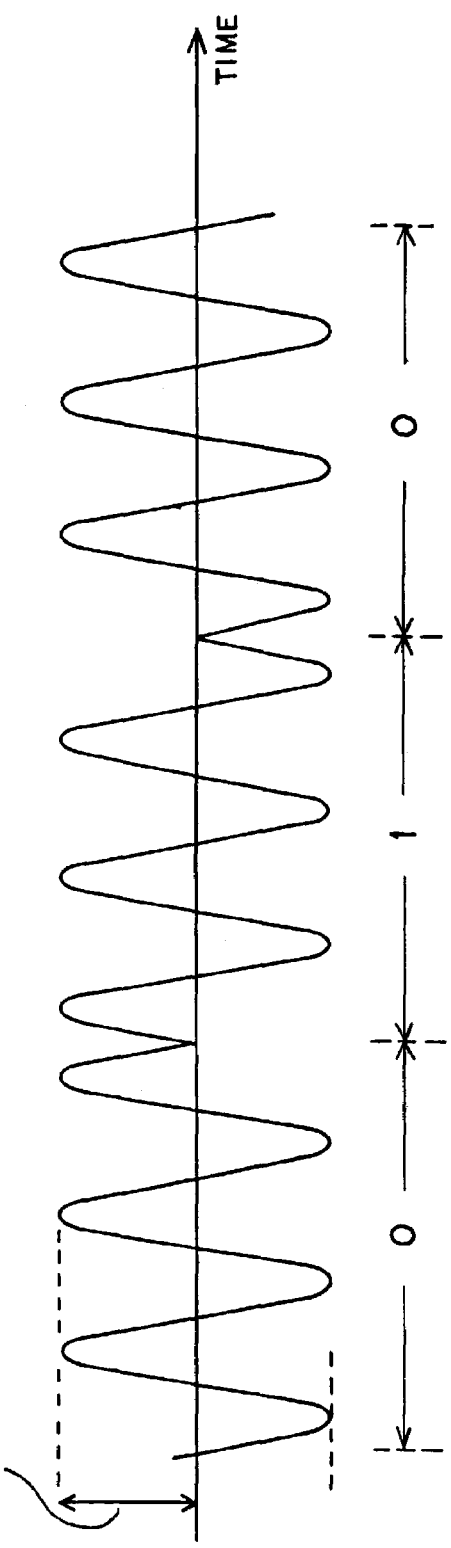
FIGS. 8A and 8B show a signal transmitted from a base station to a mobile station through the AICH.
Figure 8B:
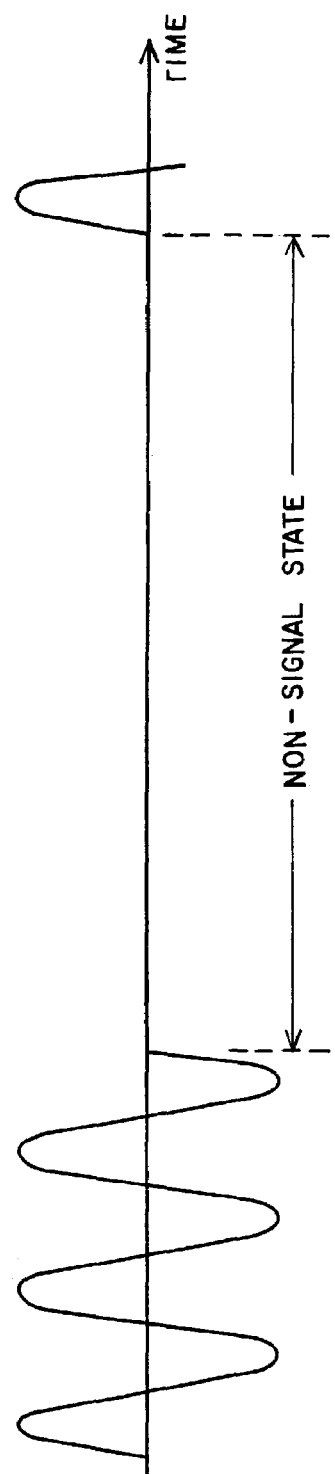

FIGS. 8A and 8B show a radio signal transmitted from the base station 1 to the mobile station 2. When the "signature (or the inverted signature)" is transmitted from the base station 1 to the mobile station 2 through the AICH, the amplitude of the radio signal is, as shown in FIG. 8A, proportional to the distance between the origin on the phase plane and the corresponding signal point in FIG. 7. On the other hand, when the AICH is in the no-signal state, the amplitude of the radio signal is zero as shown in FIG. 8B.

The mobile station 2 which has transmitted the connection request demodulates the radio signal through the AICH from the base station 1, and then determines according to the demodulation signal whether or not the requested communications have been enabled.

Figure 9:
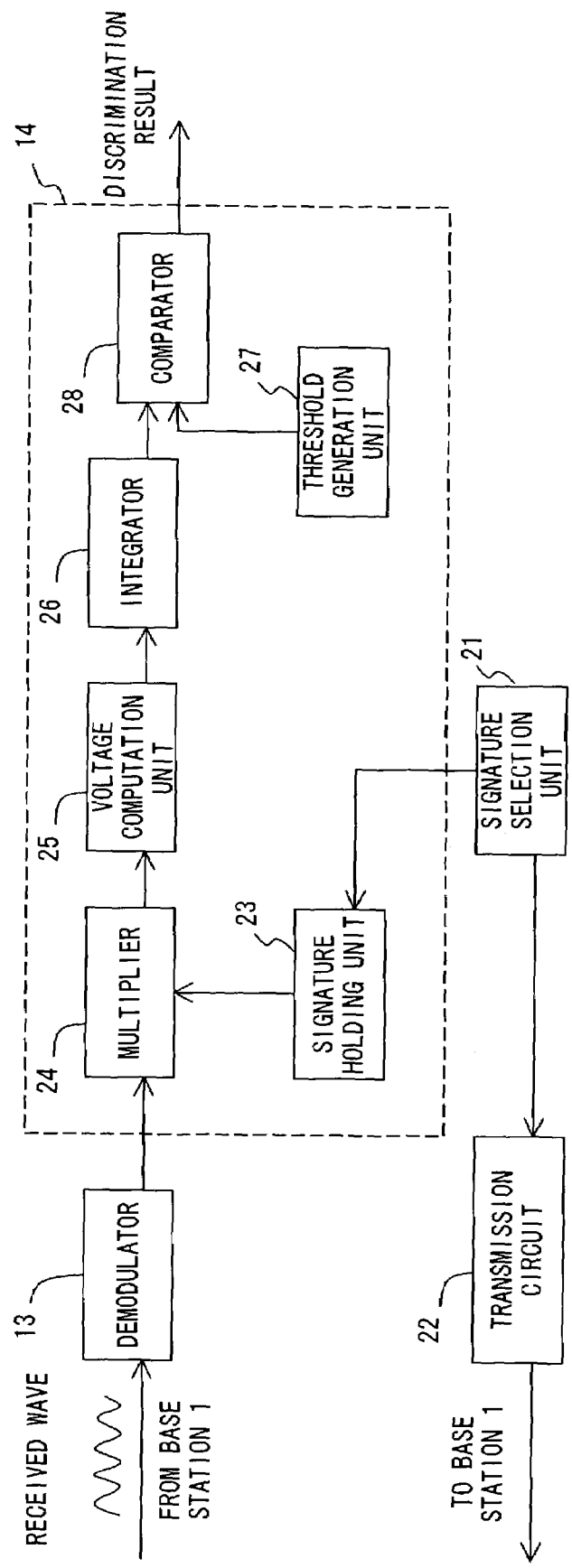
FIG. 9 is a block diagram of the circuit portion for providing the function of demodulating and analyzing the AICH.

FIG. 9 is a block diagram of the circuit portion for providing the function of demodulating and analyzing the AICH. The circuit portion is mainly realized by the demodulator 13 and the discriminator 14 shown in FIG. 4.

A signature selection unit 21 selects one of the 16 predetermined orthogonal codes, and transmits the selected code as "signatures" to a transmission circuit 22. The transmission circuit 22 transmits a connection request including the "signature" selected by the signature selection unit 21 to the base station 1. At this time, the "signature" is held by a signature holding unit 23. The signature selection unit 21 is provided, for example, in the control unit 11 shown in FIG. 4. The transmission circuit 22 includes the modulator 12 shown in FIG. 4.

The base station 1 determines whether of not the requested communications can be enabled as described above, and notifies the mobile station 2 of the determination result using the AICH. If the communications are enabled, the "signature" is returned as is. If they are disabled, the "no-signal state" is returned. If the start of the communications is suspended, the "inverted signature" is returned.

The demodulator 13 demodulates the AICH. Practically, the demodulator 13 detects the I component and the Q component of each symbol transmitted via the notification slot of the AICH by monitoring the amplitude and the phase of a received wave. A multiplier 24 multiplies the I component and the Q component of each symbol detected by the demodulator 13 by the corresponding bit of the "signature" held by the signature holding unit 23.

A voltage computation unit 25 computes the voltage of each symbol based on the I component and the Q component of each symbol output from the multiplier 24. An integrator 26 accumulates the voltage of each symbol computed by the voltage computation unit 25.

A threshold generation unit 27 generates a threshold for determination of the output of the integrator 26 based on the communications environment, etc. A comparator 28 compares the output of the integrator 26 with the threshold generated by the threshold generation unit 27, and outputs the result. The output of the comparator 28 is a determination result of the AICH, and indicates whether or not the requested communications have been enabled by the base station 1.

Described below is a practical example. For easier explanation, the data length of the "signature" is assumed to be 4 bits. It is also assumed that the mobile station 2 selects "0101" as a "signature", and transmits a connection request including the signature to the base station 1.

(1) In a Case where the Communications are Enabled

The base station 1 returns the "signature=0101" received as a connection request to the mobile station 2. As described above by referring to FIG. 7, "0" is positioned at the signal point A, and "1" is positioned at the signal point B. Therefore, when the "signature=0101" is returned to the mobile station 2, the first, second, third, and fourth symbols of the notification slot of the AICH are positioned at the signal points A, B, A, and B, respectively.

The demodulator 13 detects the I component and the Q component of each of the first through fourth symbols of the notification slot by demodulating the AICH. In this example, it is assumed that the result shown in FIG. 10 is obtained for the first through fourth symbols. Here, the phase rotation in the transmission path is assumed to be corrected by the well-known technology. I1, I3, Q1, and Q3 are positive values, and I2, I4, Q2, and Q4 are negative values.

Figure 12:
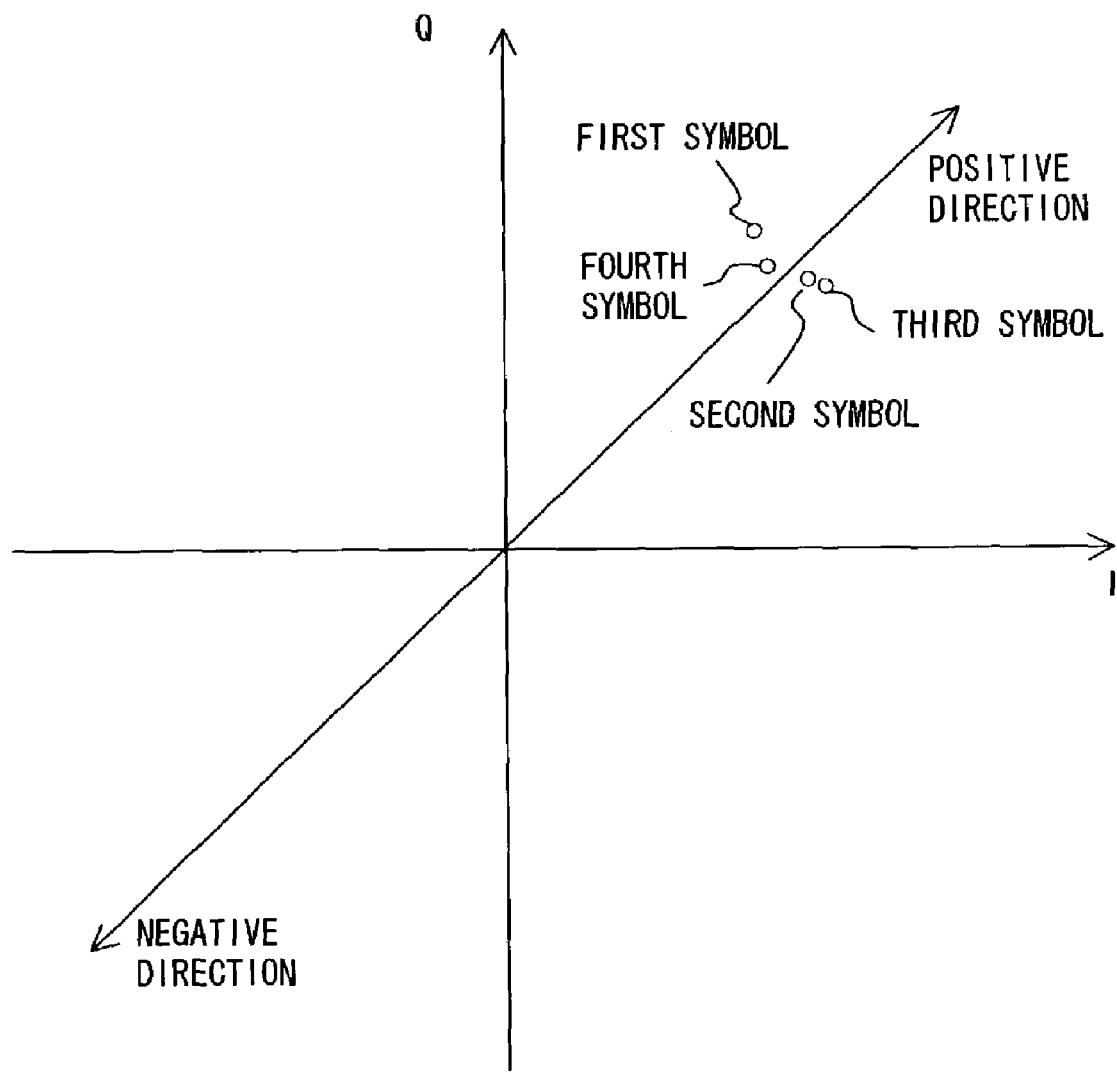
FIG. 12 shows the output of the multiplier.

The multiplier 24 multiplies the I component and the Q component of the first through fourth symbols of the notification slot by the corresponding bit of the "signature" held by the signature holding unit 23. If the corresponding bit of the "signature" is "0", the multiplier 24 outputs the input I component data and Q component data as is as shown in FIG. 11A. On the other hand, if the corresponding bit of the "signature" is "1", the multiplier 24 inverts the signs of the input I component data and Q component data as shown in FIG. 11B. Here, in this example, the first and third bits of the "signature" are "0", and the second and fourth bits are "1". Therefore, the I component and the Q component of the first and third symbols of the notification slot remain unchanged, and the signs of the I component and the Q component of the second and fourth symbols are inverted. As a result, the signal points of the first through fourth symbols are all positioned in the first quadrant of the I–Q coordinates as shown in FIG. 12.

The voltage computation unit 25 computes for each symbol the voltages corresponding to the I component and the Q component output from the multiplier 24. The voltage is represented by the distance between the origin on the phase plane and each signal point. The sign of the voltage is set with the direction of 45 degrees on the phase plane as the positive direction as shown in FIG. 12. The voltages of the first through fourth symbols are computed as follows. In the equation below, "G1" through "G4" respectively indicate the signal point ((+1, +1) or (−1, −1)) at which the first through fourth bits of the "signature" are mapped.

first symbol: $V1=(1/\sqrt{2})G1 \cdot (I1+Q1)$ second symbol: $V2=(1/\sqrt{2})G2 \cdot (I2+Q2)$ third symbol: $V3=(1/\sqrt{2})G3 \cdot (I3+Q3)$ fourth symbol: $V4=(1/\sqrt{2})G4 \cdot (I4+Q4)$ The integrator 26 accumulates the voltage value of each symbol computed by the voltage computation unit 25. That is, the following arithmetic operation is performed.

Integral $S=V1+V2+V3+V4$

Afterwards, the integral S is compared with the threshold generated by the threshold generation unit 27. The comparing process is described later.

(2) In a Case where the Communications are Disabled

The base station 1 sets the notification slot of the AICH in the "no-signal state". The "no-signal state" refers to the "origin" in the phase plane. Therefore, if the notification slot in the no-signal state is demodulated, the signal points corresponding to the first through fourth symbols are positioned near the origin. That is, the I components and the Q components of each symbol are zero or substantially zero.

Thus, if the detected signal point is near the origin, the corresponding voltage is substantially zero. Therefore, the accumulated value of the voltages is also substantially zero.

(3) In a Case where the Start of the Communications is Suspended,

The base station 1 returns the "inverted signature" to the mobile station 2. That is, the base station 1 transmits "1010" to the mobile station 2 using the AICH. At this time, the first, second, third, and fourth symbols of the notification slot of the AICH are respectively positioned at the signal points B, A, B, and A.

Figure 13A:
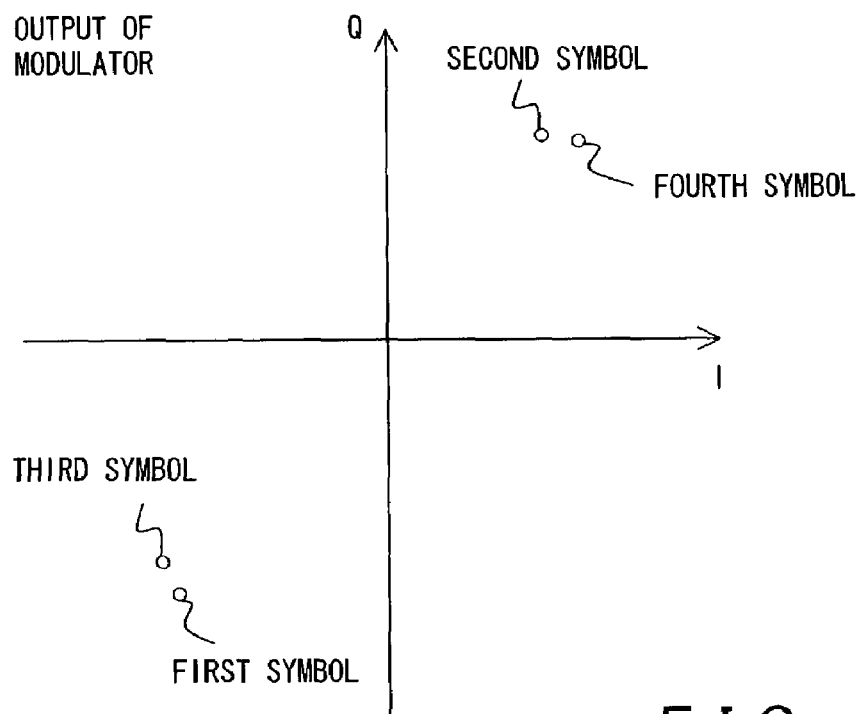
FIG. 13A shows the output of a modulator when the start of the communications is suspended.

The demodulator 13 detects the I components and the Q components of the first through fourth symbols of the notification slot by demodulating the AICH. In this example, it is assumed that the result shown in FIG. 13A is obtained.

Figure 13B:
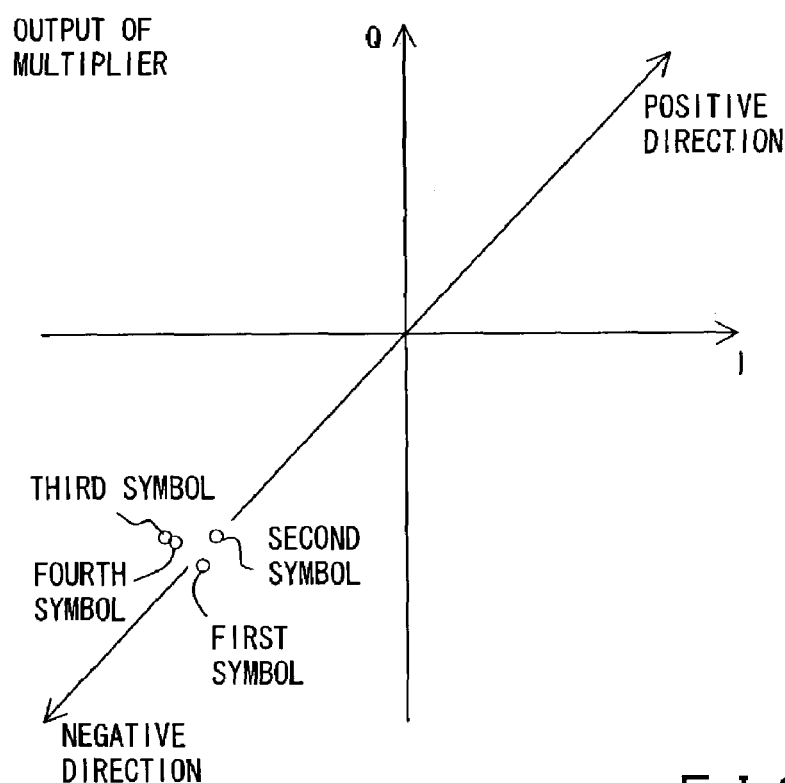
FIG. 13B shows the output of a multiplier when the start of the communications is suspended.

The multiplier 24 multiplies the I component and the Q component of the first through fourth symbols of the notification slot by the corresponding bit of the "signature" held by the signature holding unit 23. The operations of the multiplier 24 are described above by referring to FIGS. 11A and 11B. Therefore, the I component and the Q component of the first and third symbols of the notification slot remain unchanged, and the signs of the I component and the Q component of the second and fourth symbols are inverted. As a result, the signal points of the first through fourth symbols are all positioned in the third quadrant of the I–Q coordinates as shown in FIG. 13B.

The voltage computation unit 25 computes for each symbol the voltages corresponding to the I component and the Q component output from the multiplier 24. Here, the sign of the voltage is set with the direction of 45 degrees on the phase plane as the positive direction as described above. Thus, the voltages of the first through fourth symbols are computed as follows as in the case in which the communications are enabled.

first symbol: $V1=(1/\sqrt{2})G1 \cdot (I1+Q1)$ second symbol: $V2=(1/\sqrt{2})G2 \cdot (I2+Q2)$ third symbol: $V3=(1/\sqrt{2})G3 \cdot (I3+Q3)$ fourth symbol: $V4=(1/\sqrt{2})G4 \cdot (I4+Q4)$ As described above, the integrator 26 accumulates the voltage value of each symbol computed by the voltage computation unit 25.

Figure 14:
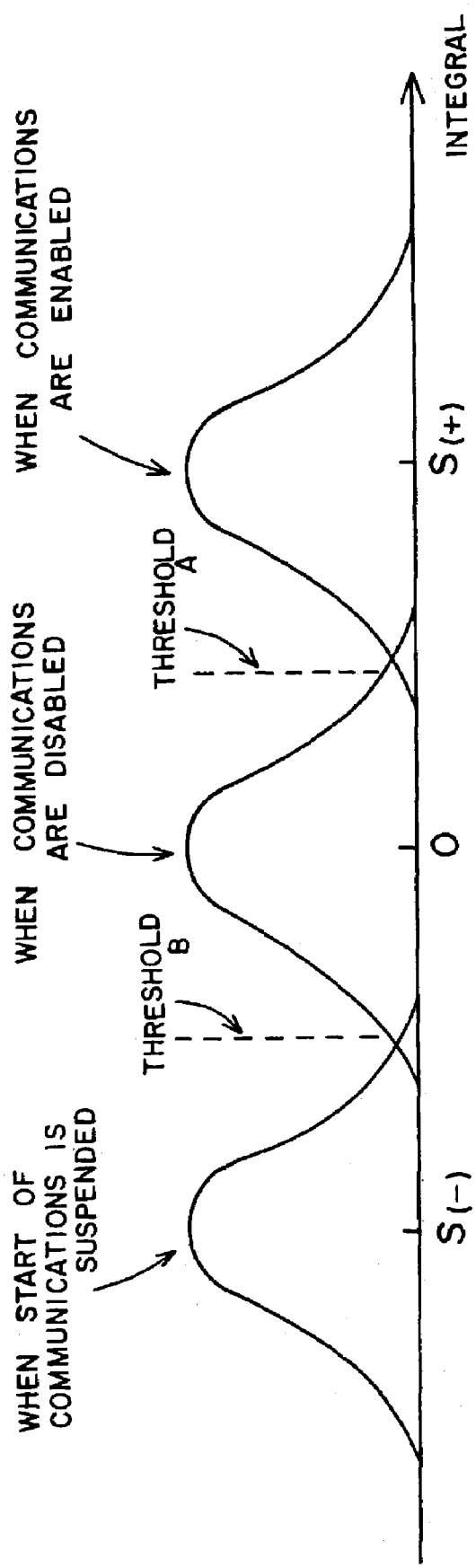
FIG. 14 is a typical view of the distribution of the output of an integrator.

FIG. 14 shows the distribution of the output of the integrator 26. That is to say, FIG. 14 shows the distribution of the integral for voltage values of the symbols in the AICH. The integral can be referred to as an "integral S".

When the communications is enabled, the integral S(+) is obtained. When the communications are disabled, the integral is zero. When the start of the communications is suspended, the integral S(−) is obtained. In the example, S(+)=−S(−).

As described above, the voltage of each symbol computed by the voltage computation unit 25 depends on the position of the signal point of a received wave. However, the position of the signal point of a received wave fluctuates at random by noise. Therefore, a distribution of the position of the signal detected in the mobile station 2 is Gaussian. As a result, a distribution of the integral output from the integrator 26 is also Gaussian. Practically, the center of the Gaussian distribution for the integral obtained when the communications are enabled is "S(+)". The center of the Gaussian distribution for the integral obtained when the communications are disabled is "zero". The center of the Gaussian distribution for the integral obtained when the start of the communications is suspended is "S(−)". These three distributions indicate the same curves. The distribution when the communications are enabled, and the distribution when the start of the communications is suspended are symmetrical about zero.

The threshold generation unit 27 generates a threshold A and a threshold B shown in FIG. 14 depending on the communications environment, etc. These thresholds can be set to satisfy "threshold A=−threshold B".

The comparator 28 compares the integral S output by the integrator 26 with the threshold generated by the threshold generation unit 27. If the integral S is larger than the threshold A, it is determined that the requested communications have been enabled by the base station 1. If the integral S is between the threshold A and the threshold B. then it is determined that the requested communications have been disabled by the base station 1. If the integral S is smaller than the threshold B, then it is determined that the start of the requested communications is suspended.

In the random access control performed when the communications are started, the determining method according to the embodiment is specifically characterized by the method of determining a threshold. Described below is the method of determining the threshold. As described above, since the distribution when the communications are enabled and the distribution when the start of the communications is suspended appear symmetrically, the threshold (threshold A shown in FIG. 14) for discrimination of "when the communications are enabled" and "when the communications are disabled" and the threshold (threshold B shown in FIG. 14) for discrimination of "when the start of the communications is suspended" and "when the communications are disabled" can be determined in the same method. Therefore, described below is the method of determining the threshold (threshold A shown in FIG. 14) for discrimination of "when the communications are enabled" and "when the communications are disabled".

In the discrimination device according to an embodiment of the present invention, two threshold generation rules are defined. From the thresholds generated according to the rules, a preferable threshold is adaptively selected depending on the communications environment, etc.

(1) First Rule

Figure 1A:
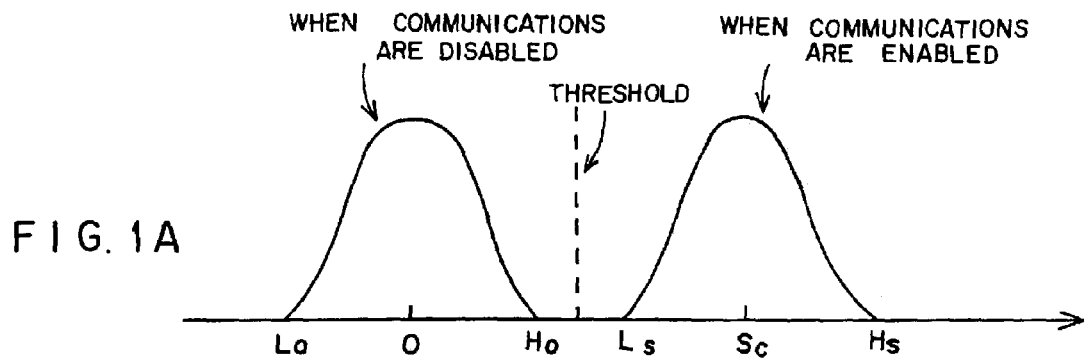
FIGS. 1A through 1C show the distribution of the integral.
Figure 1B:
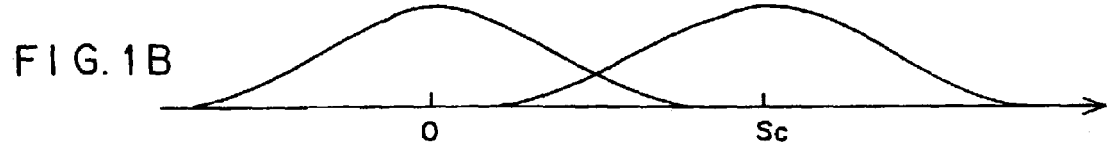
Figure 1C:
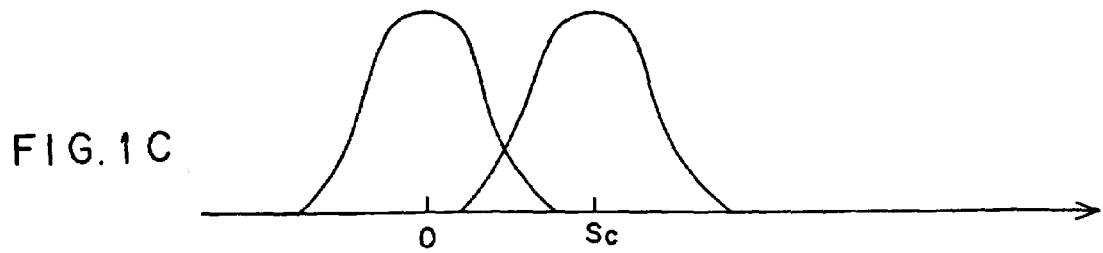
Figure 2A:
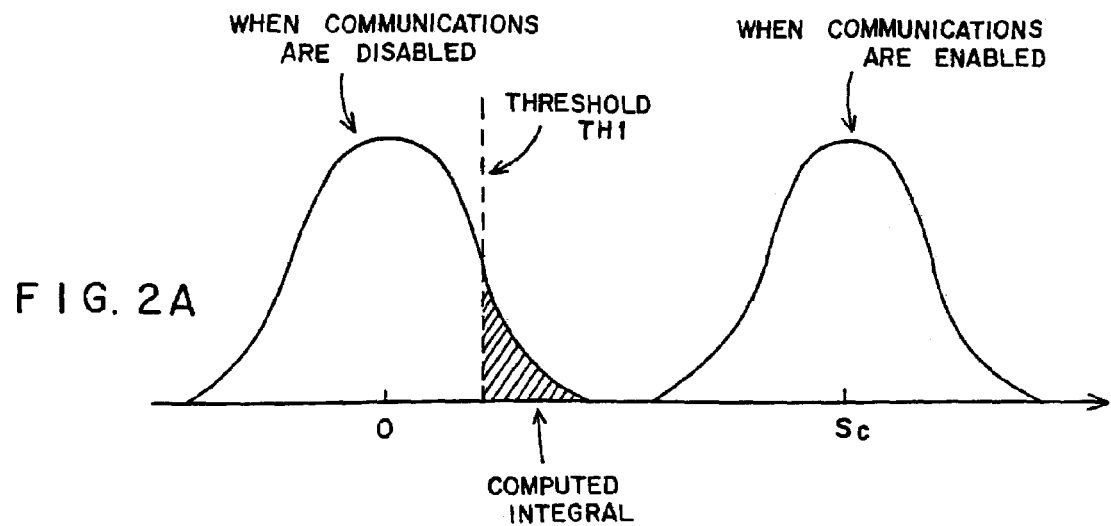
FIG. 2A is an explanatory view of the "misdetection"

According to the first rule, a threshold is determined such that a predetermined probability of misdetection is guaranteed. That is to say, the threshold is determined such that the probability of misdetection can be equal to or lower than a predetermined value. Here, the "probability of misdetection" refers to the probability that the signal transmitted through the AICH is mistakenly determined to indicate "the communications have been enabled" although it indicates "the communications have been disabled". The probability of misdetection is represented by the ratio of the area of the shaded portion to the area enclosed by the Gaussian distribution curve as described by referring to FIG. 2A.

The above mentioned integral S can be obtained by detecting the signal points for the respective symbols corresponding to the "signature" and accumulating the voltage value corresponding to each signal point. The position of the signal point of the received symbol fluctuates at random by noise. Therefore, the distribution of the integral S depends on the variance of the position of each signal point corresponding to a plurality of received symbols. That is to say, if the variance of the position of each signal point corresponding to a plurality of received symbols is obtained, the distribution of the integral S can be estimated.

The variance σ of the position of the signal point of a received symbol is computed as follows. That is, since a received signal includes noise, the position of the signal point of the i-th received symbol is expressed as follows.

$$Ii = Isi + Ini$$

$$Qi = Qsi + Qni$$

where "Is" and "Qs" indicate the components of a signal. "In" and "Qn" indicate the components of noise. In the embodiment, the I component and the Q component at the available signal points (that is, the signal points A and B) match each other as explained referring to FIG. 7. That is, they are "Isi=Qsi" according to the embodiment. Therefore, the difference between the I component and the Q component of the signal point of the i-th received symbol is represented by the following equation.

$$Ii - Qi = (Isi + Ini) - (Qsi + Qni)$$
$$= Ini - Qni$$
$$= Ni$$

Figure 15:
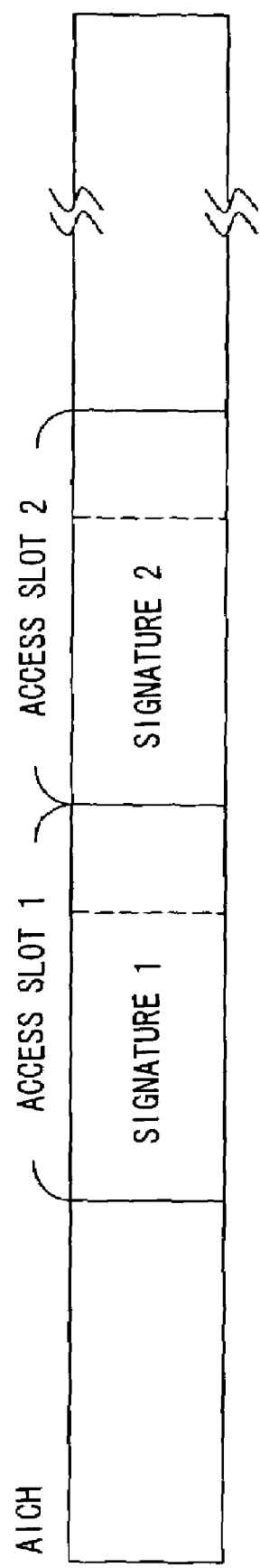
FIG. 15 is shows the configuration of the AICH.

If the difference is defined as "noise Ni of the i-th received symbol", the variance σ of the position of the signal point of the received symbol is represented by the following equation.

$$\sigma^2 = \frac{1}{k} \sum_{i=1}^{k} N_i^2$$

where "k" is basically corresponds to the number of bits of the "signature". That is, according to this embodiment, "k=16". However, a plurality of access slots can be used to compute the variance σ. That is, the AICH includes a plurality of access slots as shown in FIG. 15, and each access slot is assigned to the corresponding mobile station. In this case, for example, when the variance is computed on the 32 symbols comprising 16 symbols indicating "signature 1" stored in the access slot 1, and 16 symbols indicating the "signature 2" stored in the access slot 2, the precision will be improved. The method of computing the variance using a plurality of access slots as described above is effective when the moving speed of the mobile station 2 is low and the fading is low.

If the variance σ is computed as described above, the threshold for guarantee of a predetermined existence probability can be derived based on the variance σ. That is, in the Gaussian distribution, the shape and the extension of the distribution is characterized by a variance value. Therefore, a threshold for guarantee of a particular existence probability can be obtained by multiplying a computed variance value and predetermined constant value.

Figure 16:
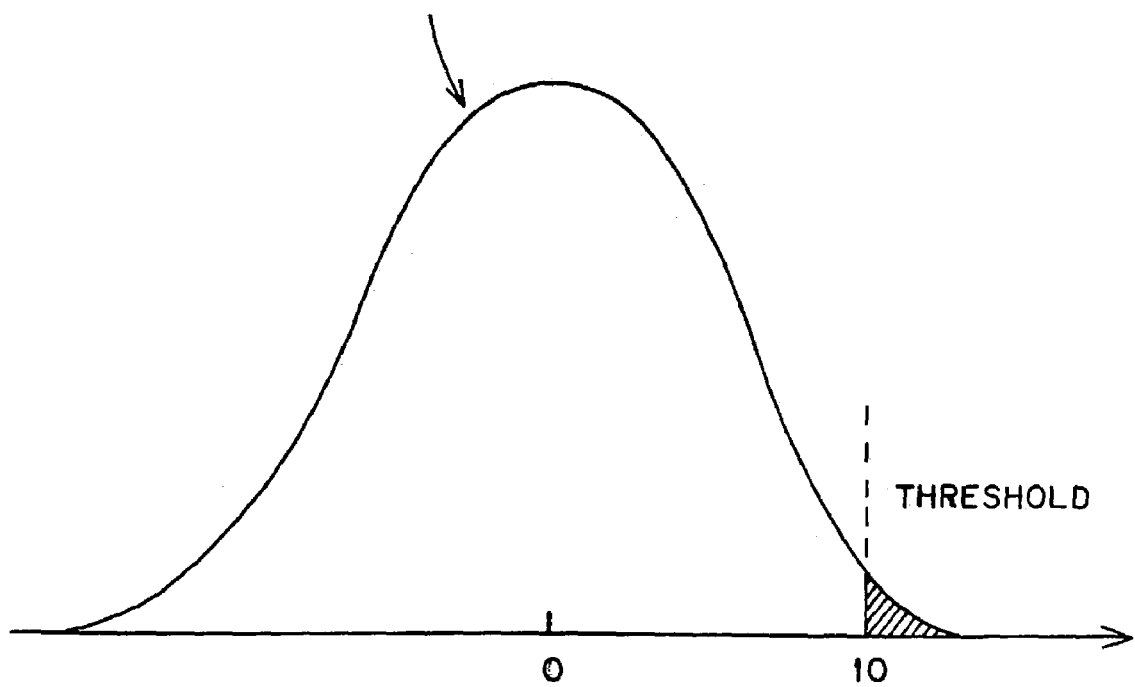
FIG. 16 is an explanatory view of the method for determining the threshold according to a first rule.

For example, assume that a computed variance σ is "2". It is also assumed that as the distribution of the integral S, the Gaussian distribution shown in FIG. 16 is obtained, and the probability of misdetection to be guaranteed is 1 percent. In this case, a threshold is determined such that the ratio of the area of the shaded portion to the area enclosed by the Gaussian distribution curve is "100:1". At this time, if the threshold is "10", the constant by which the variance σ is multiplied is "5". In this example, the values indicating the variance value and the threshold are only the values for explanation.

Thus, according to the first rule, a threshold is determined such that a predetermined probability of misdetection can be guaranteed. The threshold for guarantee of a predetermined probability of misdetection depends on the variance of the position of the signal point of a received symbol, and the extension of the variance depends on the amount of noise of a radio signal. Therefore, a threshold according to the first rule is determined based on the amount of noise of a radio signal.

(2) Second Rule

Figure 2B:
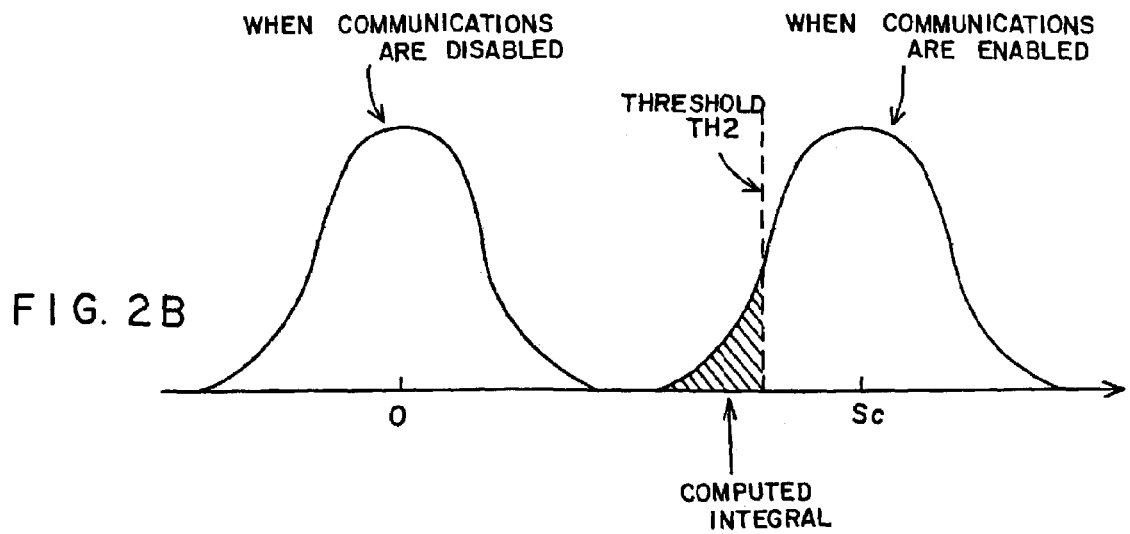
FIG. 2B is an explanatory view of the "omitted detection"

According to the second rule, a threshold is determined with the probability of omitted detection or the probability of correct detection taken into account. The probability of omitted detection refers to the probability that the signal transmitted through the AICH is mistakenly determined to indicate "the communications have been disabled" although it indicates "the communications have been enabled". The probability of omitted detection is represented by the ratio of the area of the shaded portion to the area enclosed by the Gaussian distribution curve as described by referring to FIG. 2B. On the other hand, the probability of correct detection indicates the probability that a notification in which a signal transmitted through the AICH indicates "the communications have been enabled" is correctly detected, and expressed by "1—probability of omitted detection".

Figure 17A:
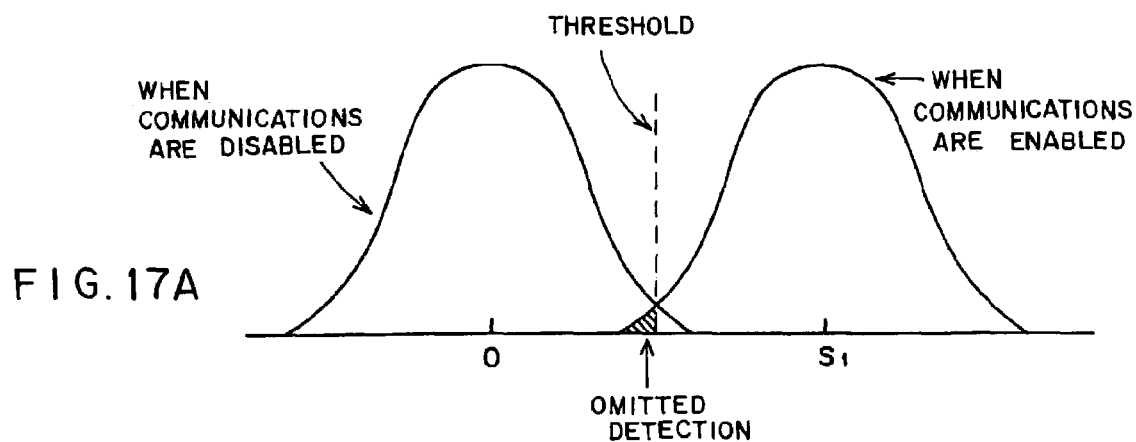
FIGS. 17A through 17C show the relationship between the distribution of the integral when the communications are enabled and the probability of omitted detection.
Figure 17B:
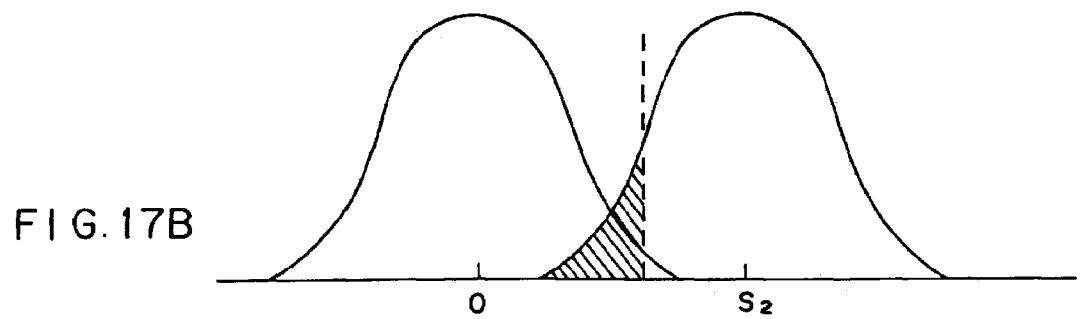
Figure 17C:
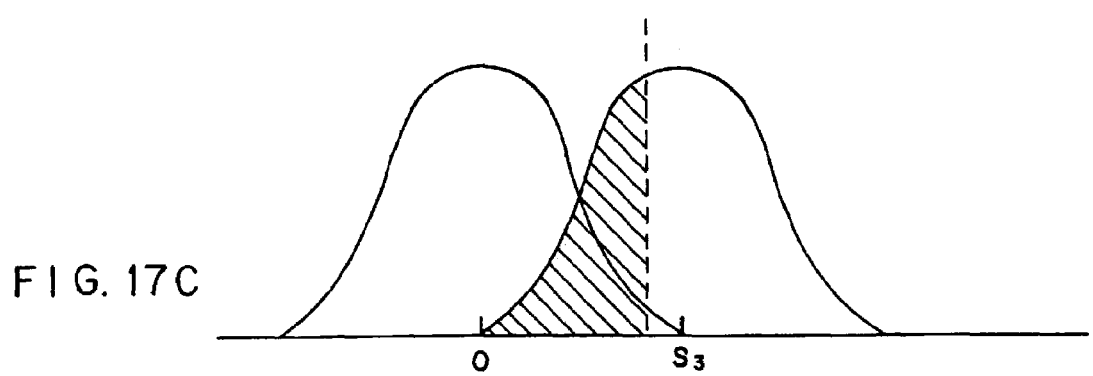

However, the probability of omitted detection or the probability of correct detection depends on the distribution of the integral S obtained when the communications are enabled. That is, as shown in FIGS. 17A through 17C, when the distribution of the integral S obtained when the requested communications are enabled changes, the probability of omitted detection also changes. Practically, when a threshold is constant, and when the central value of the distribution of the integral S obtained when the communications are enabled is smaller, the probability of omitted detection becomes larger. In FIGS. 17A through 17C, the area of the shaded area corresponds to the probability of omitted detection. Therefore, if a threshold is determined with the probability of omitted detection or the probability of correct detection taken into account, it is necessary to obtain the central value of the distribution of the integral S obtained when the communications are enabled.

The central value of the distribution of the integral S obtained when the communications are enabled is a sum of the voltages of the symbols forming the notification slot of the AICH as described above. The voltage of the received symbol is represented by the distance between the origin of the phase plane and a corresponding signal point, and indicates the amplitude of a received signal. Therefore, the central value of the distribution of the integral S obtained when the communications are enabled can be obtained by detecting the receiving amplitude or the receiving power of the AICH.

The central value of the distribution of the integral S obtained when the communications are enabled can be estimated using, for example, a pilot signal. That is to say, a downstream signal from the base station 1 to the mobile station 2 normally has a reference signal referred to as a pilot signal. The ratio of the transmitting power of the pilot signal to the transmitting power of the signal transmitted through the AICH is usually predetermined. Therefore, if the receiving power or the receiving amplitude of the pilot signal is detected, the receiving power or the receiving amplitude of the AICH can be estimated the detection. Then, based on the estimated value of the receiving power or receiving amplitude of the AICH, the central value of the distribution of the integral S obtained when the communications are enabled is estimated. The method of detecting the receiving power or receiving amplitude of the pilot signal is realized by a well-known technology.

Figure 18A:
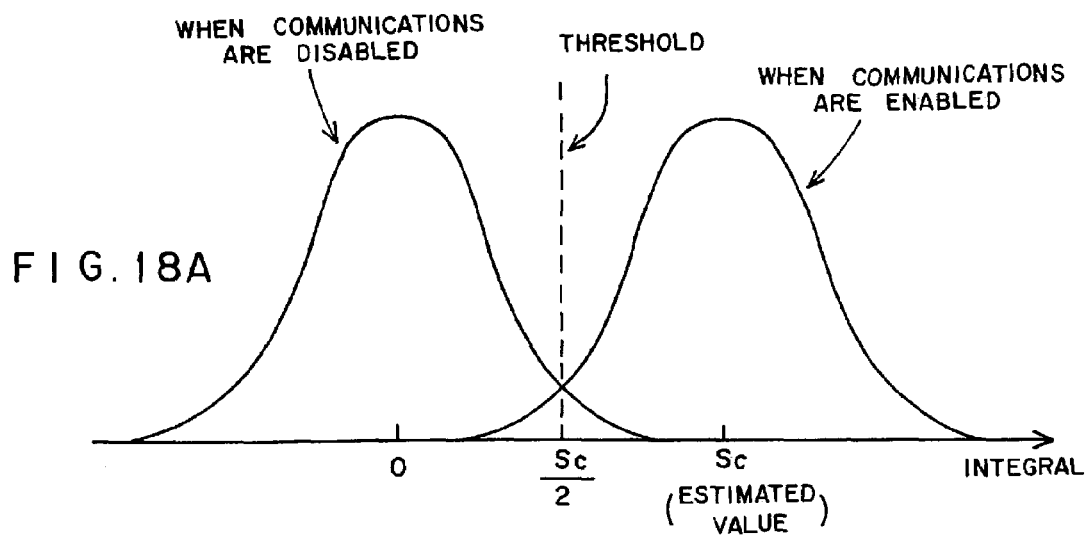
FIGS. 18A and 18B show the method for determining the threshold according to the second rule.
Figure 18B:
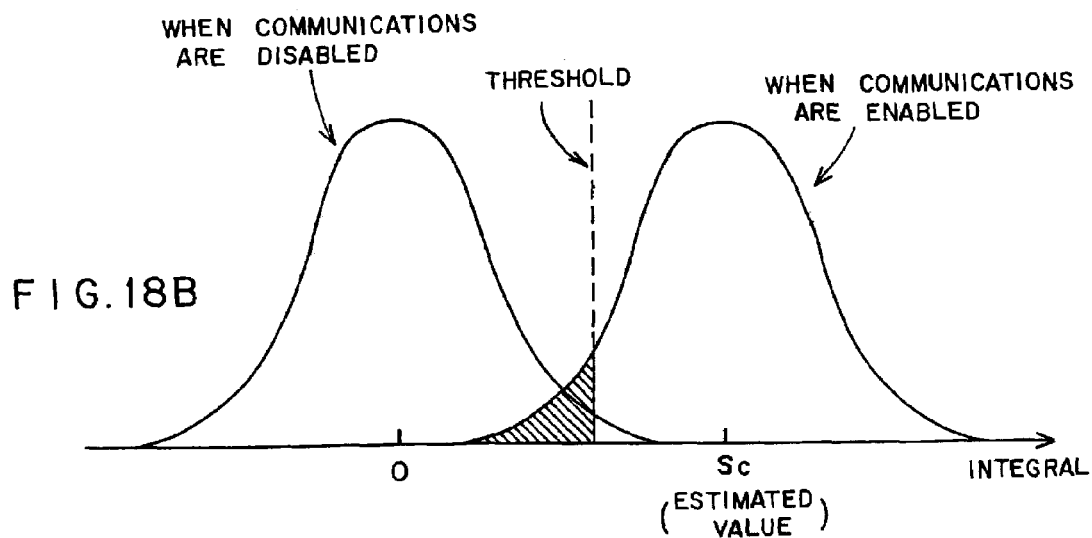

FIGS. 18A and 18B are explanatory views of the method of generating a threshold according to the second rule. In FIG. 18A, the threshold is set in the intermediate position between the central value of the distribution of the integral S obtained when the communications are enabled and "zero". That is, if the estimated central value is "Sc", then "threshold=Sc/2" is obtained. When this threshold is used by the comparator 28, the probability of misdetection and the probability of omitted detection match each other.

In FIG. 18B, the threshold is determined to guarantee a predetermined probability of omitted detection. That is, the threshold is determined such that the probability of omitted detection can be equal to or smaller than a predetermined value. The method of obtaining a threshold for guarantee of a predetermined probability of omitted detection is basically the same as the method of obtaining a threshold for guarantee of a probability of misdetection as described above. That is, in the above mentioned method, the central value Sc of the distribution of the integral S obtained when the communications are enabled is estimated, the variance σ is computed, and a threshold is determined such that the ratio of the area of the shaded portion to the area enclosed by the Gaussian distribution curve can be the probability of omitted detection to be guaranteed.

Thus, according to the second rule, a threshold is determined with the probability of omitted detection or the probability of correct detection taken into account. When a threshold is determined with the probability of omitted detection or the probability of correct detection taken into account, it is necessary to obtain the central value of the distribution of the integral S obtained when the communications are enabled, and the central value depends on the receiving power or the receiving amplitude of the AICH. Therefore, the threshold according to the second rule depends on the receiving power or the receiving amplitude of the AICH.

As described above, the discrimination device according to an embodiment of the present invention determines one or more thresholds according to the first and second rules, respectively, and adaptively selects a preferable threshold depending on the communications environment, etc. from among the thresholds.

Figure 19:
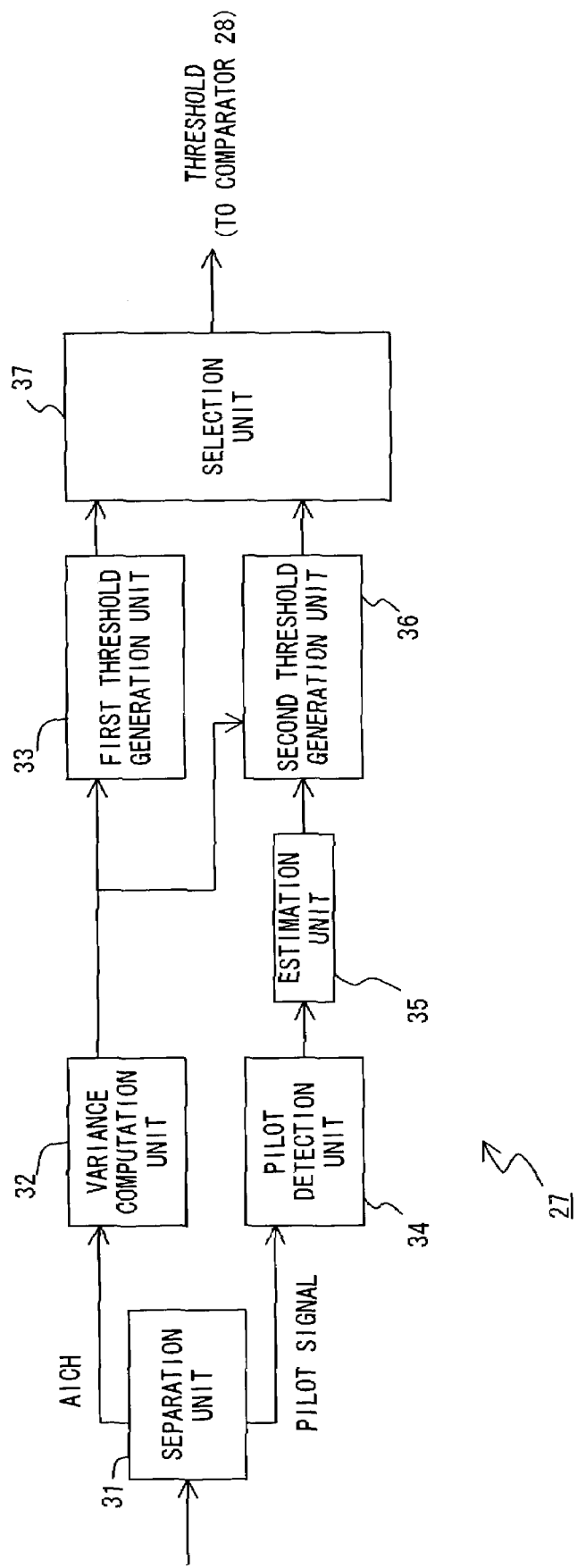
FIG. 19 is a block diagram of the threshold generation unit.

FIG. 19 is a block diagram of the threshold generation unit 27 shown in FIG. 9. The threshold generation unit 27 generates a threshold for determination of the information from the base station 1 depending on the communications environment, etc. as described above.

A separation unit 31 retrieves the AICH from a received wave to pass it to a variance computation unit 32, and retrieves a pilot signal to pass it to a pilot detection unit 34. The variance computation unit 32 computes the variance of the AICH. The method of computing the variance is described above. That is, for example, the above mentioned arithmetic operations are performed on 16 particular symbols in the AICH. A first threshold generation unit 33 generates the first threshold based on the variance value computed by the variance computation unit 32. In the method of computing the first threshold from the variance value, for example, the procedure described by referring to FIG. 16 is performed. The first threshold generation unit 33 generates one or more first thresholds.

The pilot detection unit 34 detects the receiving power or the receiving amplitude of a pilot signal. The method of detecting the power or the amplitude can be realized by the well-known technology. An estimation unit 35 estimates the central value Sc of the distribution of the integral S obtained when the requested communications are enabled based on the receiving power or the receiving amplitude of the pilot signal. The method of estimating the central value Sc is as described above. The second threshold generation unit 36 generates the second threshold based on the central value Sc estimated by the estimation unit 35. Additionally, a second threshold generation unit 36 can also generate the second threshold based on the central value Sc and the variance value computed by the variance computation unit 32. Furthermore, the second threshold generation unit 36 generates one or more second thresholds A selection unit 37 determines a preferable threshold from among thresholds generated by the first threshold generation unit 33 and the second threshold generation unit 36 depending on the communications environment. Described below is a practical example of the method of determining the threshold used by the comparator 28.

(1) First Method

Figure 20:
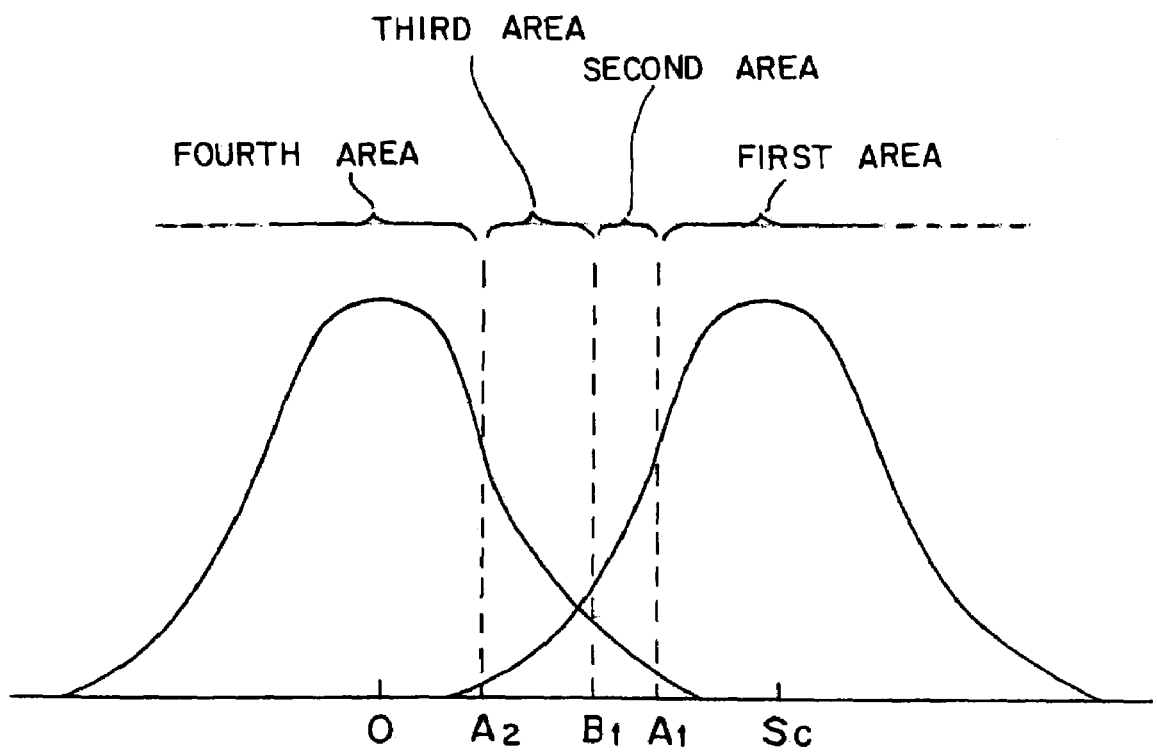
FIG. 20 is an explanatory view of the concept of the first method.

FIG. 20 is an explanatory view showing the concept of the first method. "Sc" indicates a "central value of the distribution of the integral S obtained when the communications are enabled", and can be estimated by the estimation unit 35 and computed in other methods.

"A1" is a threshold corresponding to a predetermined probability of misdetection, and is set according to the above mentioned first rule. The probability of misdetection corresponding to the threshold A1 is, for example, 1 percent. The threshold A1 can be determined to satisfy the "conformance test point" of IMT-2000.

"A2" as well as threshold A1 is a threshold corresponding to a predetermined probability of misdetection, and is set according to the above mentioned first rule. However, the probability of misdetection guaranteed by the threshold A2 is lower than the probability of misdetection guaranteed by the threshold A1. For example, it is about 10–30 percents.

"B1" is a threshold corresponding to a predetermined probability of omitted detection (or probability of correct detection), and is set according to the above mentioned second rule. In this example, it is assumed that "A1>B1≧A2" is satisfied. In this case, the three thresholds above define the first through fourth areas.

With the environment above, a provisional threshold THx is set. The "provisional threshold THx" is determined based on, for example, a central value Sc. Practically, for example, a "provisional threshold THx=Sc−α" or "provisional threshold THx=Sc×β". Here, "α" is a constant satisfying "0<α<Sc". "β" is a constant satisfying "0<β<1". In any case, the provisional threshold THx satisfies "0<provisional threshold THx<Sc".

The selection unit 37 determines an actual threshold by comparing the provisional threshold THx with "A1", "A2", and "B1". Practically, if "THx>A1", that is, if the provisional threshold THx belongs to the first area, "threshold=THx" is output. If "B1<THx≦A1", that is, if the provisional threshold THx belongs to the second area, "threshold=A1" is output. Furthermore, if "A2<THx≦B1", that is, if the provisional threshold THx belongs to the third area, "threshold=THx" is output. If "THx≦A2", that is, if the provisional threshold THx belongs to the fourth area, "threshold=A2" is output.

If a threshold is adaptively determined as described above, the following effect can be obtained as compared with the conventional case in which the threshold is fixed to "A1". First, when the communications environment is good, a threshold larger than "A1" is used, and the probability of misdetection can be zero or a very small value. Therefore, the output of the radio wave relating to the disabled communications is suppressed, and the interference with the communications established before can be reduced.

When the communications environment is not good or inferior, a threshold smaller than "A1" is used. Therefore, the case in which the communications are enabled, but are overlooked can be possibly avoided. The deterioration of the communications environment occurs not only when a number of mobile stations exist closely but also when mobile stations are located in the peripheral area (cell fringe) of a communications area. If the communications environment is not good for the latter reason, the undesired influence on other mobile stations can be relatively small although unnecessary radio waves are output by mobile stations due to misdetection. Therefore, in this case, the probability of omitted detection can be prevented from rising by intentionally raising the probability of misdetection. In the method according to the present embodiment, the threshold is determined with not only the amount of noise but also the receiving amplitude or receiving power of the AICH taken into account, thereby appropriately detecting the cause of the deterioration of a communications environment.

Figure 21:
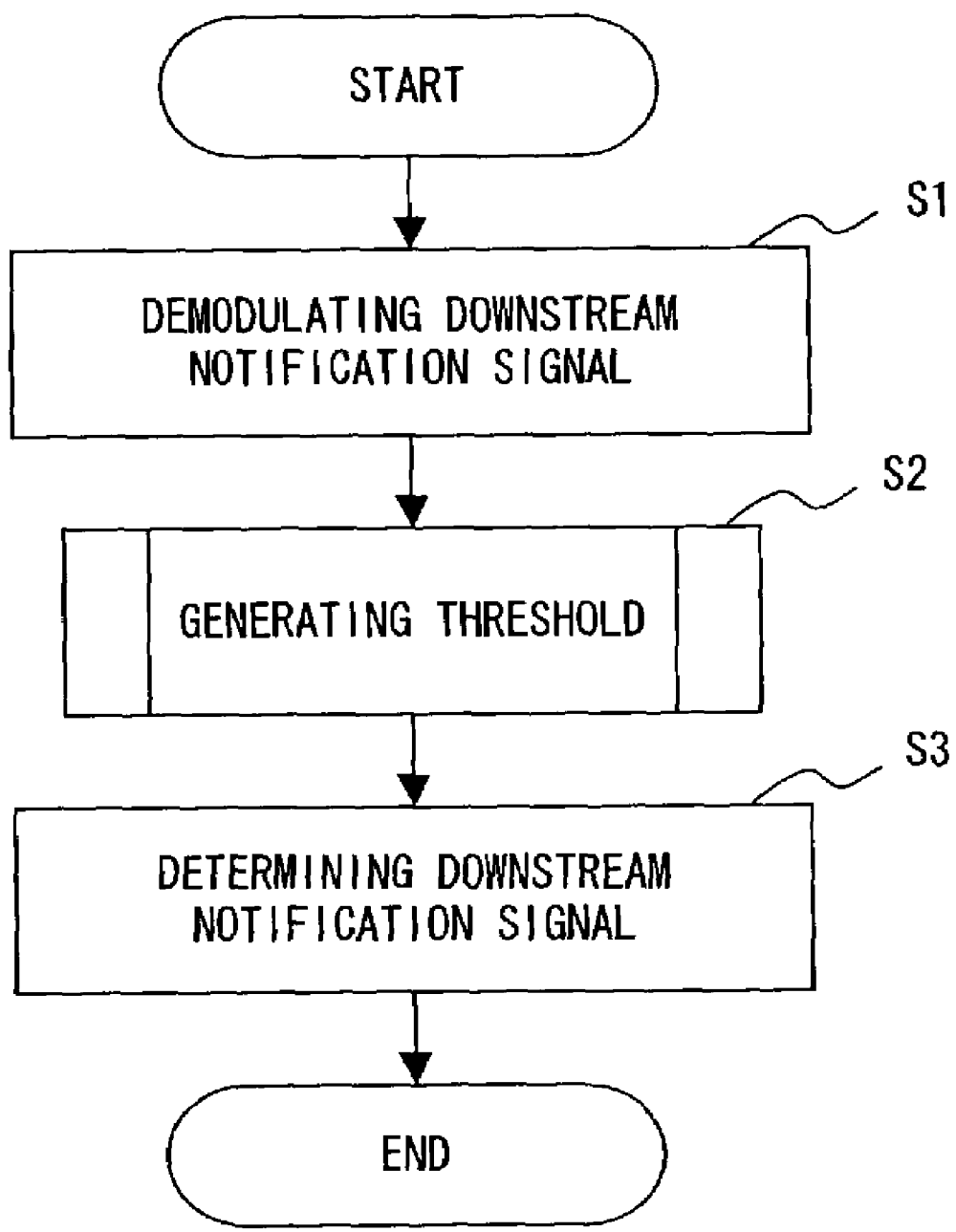
FIG. 21 is a flowchart of the operation of the mobile station relating to the generation of a threshold.

FIG. 21 is a flowchart of the operation of the mobile station 2 associated with the generation of a threshold. The process is performed after a connection request is transmitted from the mobile station 2 to the base station 1.

In step S1, a downstream notification signal from the base station 1 to the mobile station 2 is demodulated. This process is performed by the demodulator 13. In step S2, a threshold is generated. This process is performed by the threshold generation unit 27. In step S3, it is determined using the threshold generated in step S2 whether or not the demodulated downstream notification signal indicates that "the communications have been enabled". Then, according to the determination result, the subsequent processes are performed.

Figure 22:
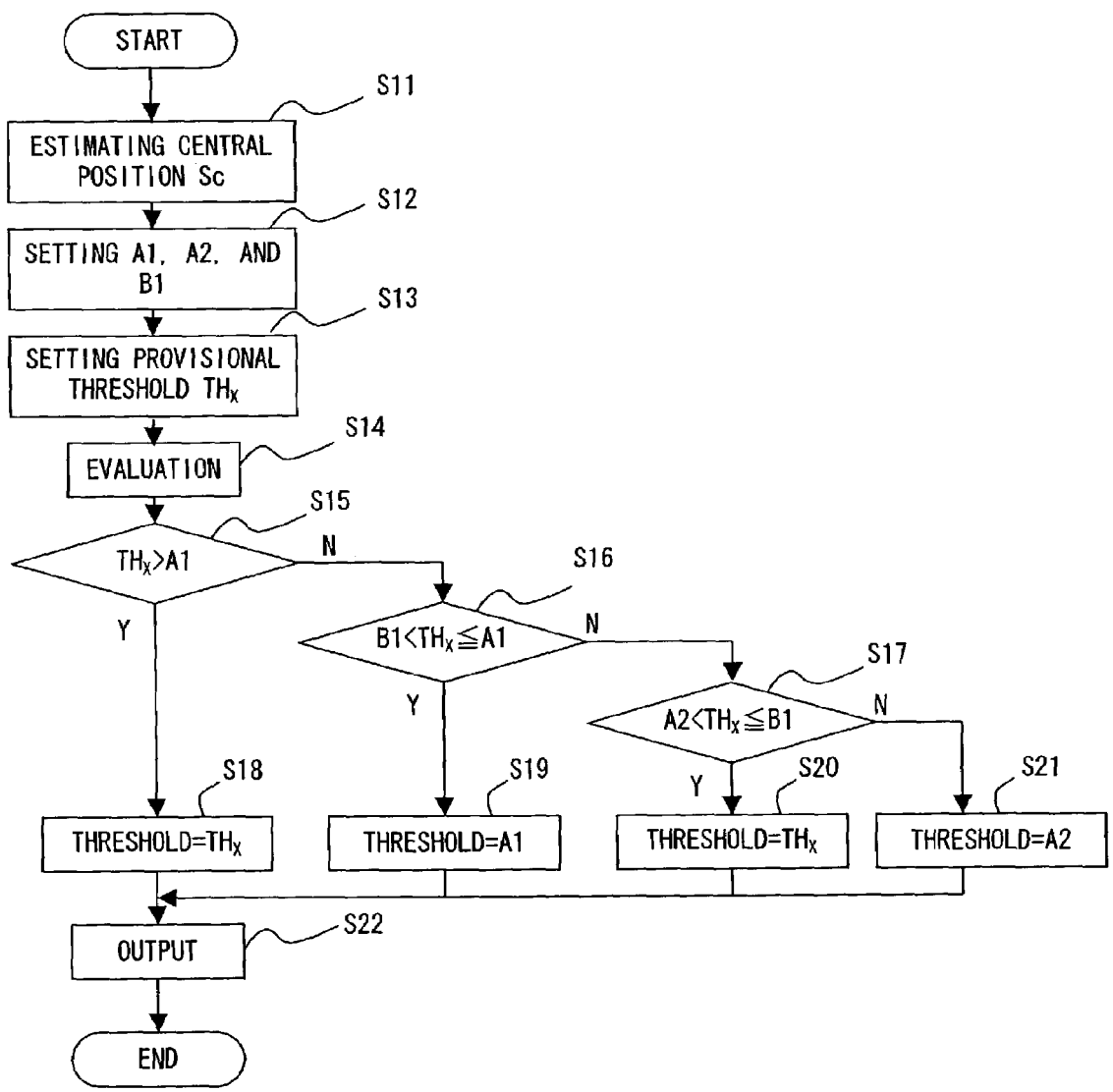
FIG. 22 is a flowchart of the process of generating a threshold according to the first method.

FIG. 22 is a flowchart of the process of generating a threshold in the first method. This process corresponds to step S2 shown in FIG. 21.

In step S11, the central value Sc of the distribution of the integral S obtained when the communications are enabled is computed. In step S12, "A1", "A2", and "B1" shown in FIG. 20 are set. In step S13, a provisional threshold THx is set. In steps S14 through S17, the provisional threshold THx is compared with "A1", "A2", and "B1". In steps S18 through S21, a corresponding threshold is determined based on the above mentioned comparison result. In step S22, a determined threshold is output. This threshold is actually used, and passed to the comparator 28.

(2) Second Method

In the second method, an actually used threshold is generate based on the two thresholds A1 and A2 generated according to the first rule and the provisional threshold THx generated according to the second rule. The threshold A1 corresponds to a predetermined probability of misdetection. The threshold A2 as well as the threshold A1 corresponds to a predetermined probability of misdetection. However, the probability of misdetection guaranteed by the threshold A2 is worse than the probability of misdetection guaranteed by the threshold A1 . The provisional threshold THx corresponds to a predetermined probability of omitted detection (or probability of correct. detection). The second method corresponds to the case in the first method in which the threshold B1 is used as a "provisional threshold THx". However, in the second method, it is not necessary to satisfy "A1>THx≧A2".

Figure 23A:
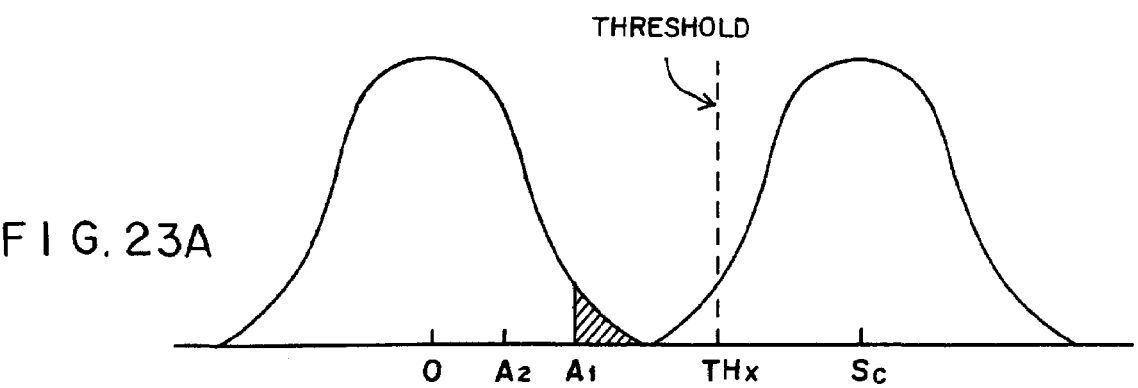
FIGS. 23A through 23C are explanatory views of the method for generating a threshold according to the second method.

FIG. 23A shows the method of determining a threshold in a case where "THx>A1". In this case, the selection unit 37 outputs "THx" as a threshold to be used. The situation occurs when the communications environment is good (receiving power is large or noise is low). When this threshold is set in the above environment, a smaller probability of misdetection is obtained. That is, a threshold is set in the conventional method, the smallest value of the probability of misdetection is a value (area of shaded portion in FIG. 23A) corresponding to the threshold A1 . However, if a threshold is set in this method, the probability of misdetection is a smaller value or zero.

Figure 23B:
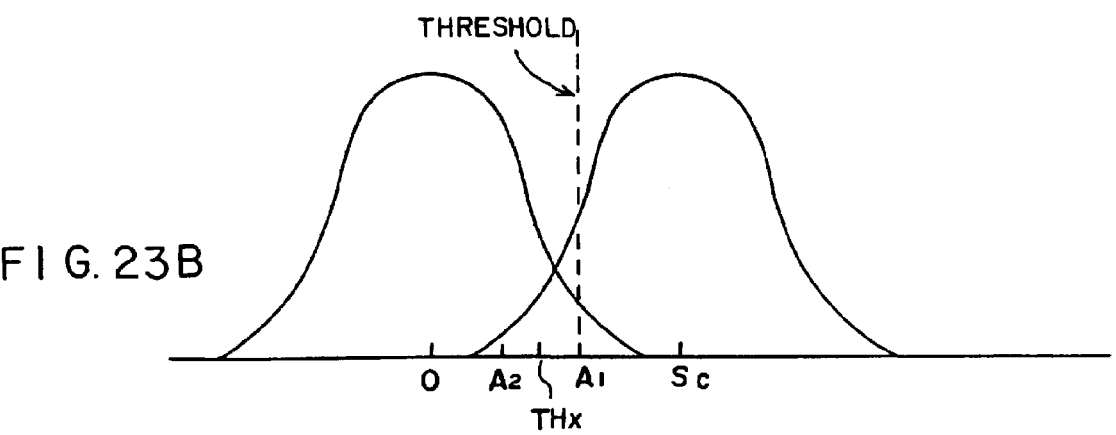

FIG. 23B shows the method of determining a threshold in a case where "A2<THx≦A1". In this case, the selection unit 37 outputs "A1" as a threshold to be used. This situation possibly occurs when receiving power is relatively small or noise is relatively large. If a threshold is set in this method, a predetermined probability of misdetection is guaranteed.

If the probability of misdetection is improved when the distribution when the communications are enabled and the distribution when the communications are disabled match each other, then the probability of omitted detection deteriorates. That is, the probability of misdetection is traded off against the probability of correct detection. Whichever is to be guaranteed, the probability of misdetection or the probability of correct detection, depends on the design policy. Therefore, in the example shown in FIG. 23B, "A1" is selected as a threshold to be used such that the probability of misdetection can be guaranteed, but a threshold for guarantee of a predetermined probability of omitted detection can be selected. In this case, the "THx" is selected as a threshold to be used in FIG. 23B.

Figure 23C:
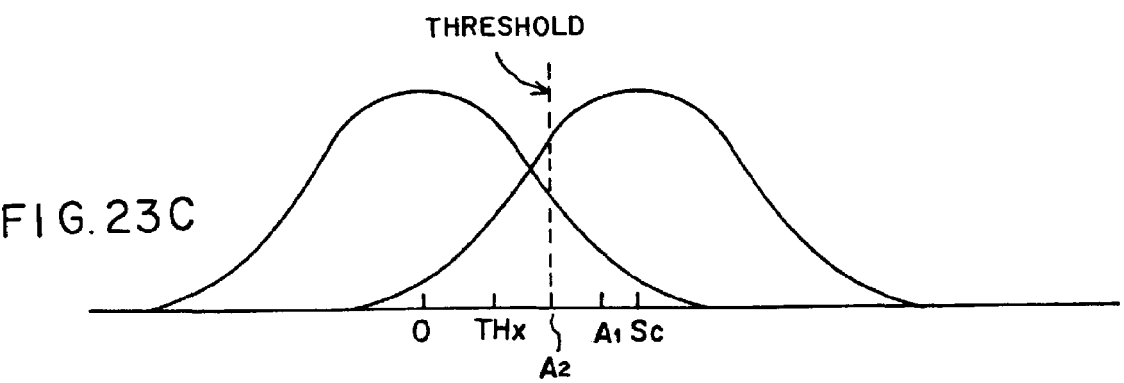

FIG. 23C shows the method of determining a threshold in a case where "THx≦A2". In this case, the selection unit 37 outputs "A2" as a threshold to be used. This situation possibly occurs, for example, when receiving power is small and noise is large. If a threshold is set in this method, the allowable worst value of a probability of misdetection is guaranteed, and the probability of omitted detection can be protected against extreme deterioration. That is, in the conventional method, the "threshold A1" is used. In this case, the probability of omitted detection is extremely high and opportunities to establish communications are frequently overlooked although the communications are enabled. On the other hand, in the method shown in FIG. 23C, the problem can be avoided.

(3) Third Method

In the third method, the threshold TH1 generated according to the first rule is compared with the threshold TH2 generated according to the second rule, and one of the thresholds is output based on the comparison result.

Figure 24:
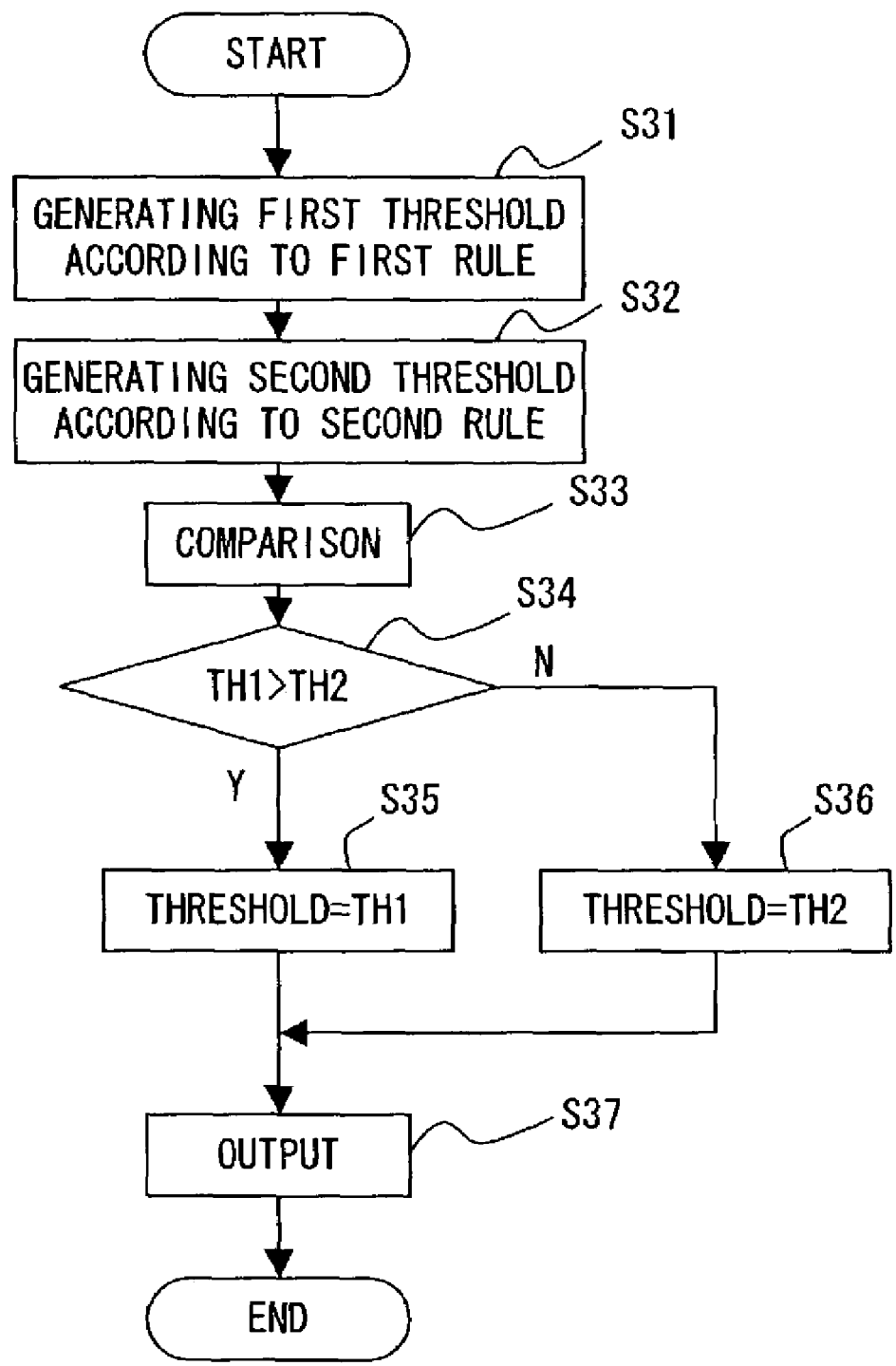
FIG. 24 is a flowchart of the process of generating a threshold according to the third method.

FIG. 24 is a flowchart of the process for generating a threshold according to the third method. In step S31, the threshold TH1 is generated according to the first rule. The threshold TH1 corresponds to, for example, a predetermined probability of misdetection. In step S32, the threshold TH2 is generated according to the second rule. The threshold TH2 is obtained by, for example, multiplying the above mentioned central value Sc by a predetermined coefficient γ (0<γ<1). In steps S33 through S36, the threshold TH1 is compared with the threshold TH2. In step S37, the result is output. Practically, if the threshold TH1 is larger than the threshold TH2, "TH1" is output as a threshold to be used. Otherwise, "TH2" is output.

In the third method, a threshold can be adjusted such that a predetermined probability of misdetection can be constantly guaranteed, and the probability of misdetection can be the smallest possible when the communications environment is good.

In the above mentioned embodiment, a threshold is used to discriminate "the communications are enabled" from "the communications are disabled", but a threshold for discrimination between "the start of the communications is suspended" and "the communications are disabled" can be set in the similar procedure.

A threshold can also be determined, without computing the variance, based on the central value of the distribution of the integral S obtained when the communications are enabled. In this case, since the probability of misdetection does not depend on the variance value, the probability of misdetection does not unnecessarily deteriorate although the variance value cannot be correctly computed.

Furthermore, in the above mentioned embodiment, the AICH is explained, but the present invention is not limited to this application. That is, the technological concept of the present invention can be used when a value indicating the control information transmitted from a base station to a mobile station is discriminated. Practically, it is available when the values displayed by the PICH (paging indicator channel), TPC, TFCI, and SW are determined.

The PICH is a channel for transmitting information for control of the power consumed by a mobile station in a wait state, and "+1" or "−1" is transmitted. In this case, the threshold is determined with both power consumption and easy connection taken into account.

The TPC is power control information set in the downstream DPCCH, and, for example, "+1: power up", "power down", or "0: unchanged" is transmitted.

The TFCI is a part of the downstream DPCCH, and transmits a signal for notification of the combination pattern of a packet with the DPCH to the mobile station.

The SW is a part of the downstream DPCCH, and is used for synchronous detection. "+1" or "0" is transmitted.

According to the present invention, the method for determining a threshold for discrimination as to whether a radio signal indicates a first value or a second value is determined depending on the communications environment, and the radio signal is discriminated using the threshold determined according to the method. Therefore, the discrimination error of a control signal transmitted in the mobile communications system can be reduced.

What is claimed is:

1. A signal discrimination device, which is used in a mobile communications system for transmitting a radio signal from a first device to a second device, for determining whether the radio signal indicates first information or second information, comprising:
    a demodulation unit demodulating a received radio signal;
    a first threshold generation unit calculating a variance of voltage of the radio signal, and generating a first threshold to guarantee a predetermined probability of misdetection according to the calculated variance;
    a second threshold generation unit estimating a difference between a center voltage of a signal propagating the first information and a center voltage of a signal propagating the second information based on received power or received amplitude of the radio signal, and generating a second threshold to guarantee a predetermined probability of omitted detection according to the estimated value;
    a selection unit selecting one of the first threshold and the second threshold according to a communications environment; and
    a discrimination unit determining whether the radio signal indicates the first information or the second information based on a comparison result between an output of said demodulation unit and the selected threshold selected by said selection unit.

2. The device according to claim 1, wherein:
    said first information and second information are to be transmitted from the first device to the second device after phase modulation using a signal point in which an I component equals a Q component, respectively; and
    said threshold generation unit computes a difference between the I component and the Q component for each symbol of a received radio signal, and uses a variance of each difference value as the amount of noise.

3. The device according to claim 1, wherein:
the radio signal comprises a pilot signal and a notification signal indicating the first information or the second information; and
said threshold generation unit estimates receiving power or receiving amplitude of the notification signal based on receiving power or receiving amplitude of the pilot signal, and generates a threshold according to the second rule using the estimated value.

4. A signal discrimination device, which is used in a mobile communications system for transmitting a radio signal from a first device to a second device, for determining whether the radio signal indicates first information or second information, comprising:
a demodulation unit demodulating a received radio signal;
a threshold generation unit selecting based on a communications environment one of a first rule for generating a threshold such that a probability that it is mistakenly determined that the radio signal indicates the second information although the radio signal actually indicates the first information can be equal to or smaller than a predetermined value and a second rule for generating a threshold such that a probability that it is mistakenly determined that the radio signal indicates the first information although the radio signal actually indicates the second information can be equal to or smaller than a predetermined value, and generating a threshold according to the selected rule; and
a determination unit determining whether the radio signal indicates the first information or the second information based on a result of comparing output of said demodulation unit with a threshold generated by said threshold generation unit.

5. A signal discrimination device, which is used in a mobile communications system for transmitting a radio signal from a first device to a second device, for determining whether the radio signal indicates first information or second information, comprising:
a demodulation unit demodulating a received radio signal;
a first threshold generation unit calculating a variance of voltage of the radio signal, and generating a first threshold to guarantee a predetermined probability of misdetection according to the calculated variance;
a second threshold generation unit estimating a difference between a center voltage of a signal propagating the first information and a center voltage of a signal propagating the second information based on received power or received amplitude of the radio signal, and generating second threshold to guarantee a predetermined probability of omitted detection according to the estimated value:
a selection unit selecting one of the first threshold and the second threshold based on a comparison between the first and second thresholds; and
a determination unit determining whether the radio signal indicates the first information or the second information based on a result of comparing an output of said demodulation unit with the selected threshold selected by said selection unit.

6. A signal discrimination device for use in a communications system in which a first communications device transmits to a second communications device a connection request containing identification information identifying the first communications device, and the second communications device returns to the first communications device the identification information at a predetermined timing when communications corresponding to the connection request are enabled, comprising:
a multiplier multiplying a received signal at the predetermined timing by the identification information in the first communications device;
an integrator integrating an output of said multiplier;
a first threshold generation unit calculating a variance of voltage of the radio signal, and generating a first threshold to guarantee a predetermined probability of misdetection according to the calculated variance:
a second threshold generation unit estimating a difference between a center voltage of a signal propagating the first information and a center voltage of a signal propagating the second information based on received power or received amplitude of the radio signal, and generating a second threshold to guarantee a predetermined probability of omitted detection according to the estimated value;
a selection unit selecting one of the first threshold and the second threshold according to a communications environment; and
a discrimination unit determining whether or not the communications corresponding to the connection request have been enabled based on a result of comparing an output of said integrator with the selected threshold selected by said selection unit.

7. A mobile station for use in a communications system in which the mobile station transmits to a base station a connection request including identification information identifying the mobile station, and the base station returns to the mobile station the identification information at a predetermined timing when communications corresponding to the connection request is enabled, comprising:
a multiplier multiplying a received signal by the identification information at the predetermined timing;
an integrator integrating an output of said multiplier;
a first threshold generation unit calculating a variance of voltage of the radio signal and generating a first threshold to guarantee a predetermined probability of misdetection according to the calculated variance;
a second threshold generation unit estimating a difference between a center voltage of a signal propagating the first information and a center voltage of a signal propagating the second information based on received power or received amplitude of the radio signal, and generating a second threshold to guarantee a predetermined probability of omitted detection according to the estimated value;
a selection unit selecting one of the first threshold and the second threshold according to a communications environment;
a discrimination unit determining whether or not the communications corresponding to the connection request have been enabled based on a result of comparing an output of said integrator with the selected threshold selected by said selection unit; and
a control unit starting communications, when said discrimination unit determines that the communications are enabled.

8. A signal discriminating method, which is used in a mobile communications system for transmitting a radio signal from a first device to a second device, for determining whether the radio signal indicates first information or second information, comprising:
demodulating a received radio signal;

calculating a variance of voltage of the radio signal, and generating a first threshold to guarantee a predetermined probability of misdetection according to the calculated variance;

estimating a difference between a center voltage of a signal propagating the first information and a center voltage of a signal propagating the second information based on received power or received amplitude of the radio signal, and generating second threshold to guarantee a predetermined probability of omitted detection according to the estimated value;

selecting one of the first threshold and the second threshold according to a communications environment; and determining whether the radio signal indicates the first information or the second information based on a comparison result between the demodulated signal obtained in said demodulating step and the selected threshold selected in said selecting step.

9. A signal discriminating method, which is used in a mobile communications system for transmitting a radio signal from a first device to a second device, for determining whether the radio signal indicates first information or second information, comprising:

demodulating a received radio signal;

calculating variance of voltage of the radio signal and generating a first threshold to guarantee a predetermined probability of misdetection according to the calculated variance;

estimating a difference between a center voltage of a signal generating the first information and a center voltage of a signal propagating the second information based on received power or received amplitude of the radio signal, and generating a second threshold to guarantee a predetermined probability of omitted detection according to the estimated value;

selecting one of the first threshold and the second threshold based on a comparison between the first and, second thresholds; and determining whether the radio signal indicates the first information or the second information based on a comparison result between the demodulated signal obtained in said demodulating step and the selected threshold selected in said selecting step.

* * * * *